United States Patent
Santamaria-Pang et al.

(10) Patent No.: US 8,908,945 B2
(45) Date of Patent: Dec. 9, 2014

(54) BIOLOGICAL UNIT IDENTIFICATION BASED ON SUPERVISED SHAPE RANKING

(71) Applicant: General Electric Company, Schenectady, NY (US)

(72) Inventors: Alberto Santamaria-Pang, Niskayuna, NY (US); Yuchi Huang, Beijing (CN); Jens Rittscher, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 270 days.

(21) Appl. No.: 13/657,255

(22) Filed: Oct. 22, 2012

(65) Prior Publication Data

US 2014/0112557 A1    Apr. 24, 2014

(51) Int. Cl.
 G06K 9/00    (2006.01)
 G06K 9/34    (2006.01)

(52) U.S. Cl.
 CPC .......................... *G06K 9/34* (2013.01)
 USPC ........................................... 382/128; 382/133

(58) Field of Classification Search
 None
 See application file for complete search history.

(56) References Cited

U.S. PATENT DOCUMENTS 7,949,474 B2    5/2011    Callahan et al.
 2006/0204953 A1*  9/2006   Ptitsyn ............................ 435/4

OTHER PUBLICATIONS

Marcuzzo et al ("Automated *Arabidopsis* plant root cell segmentation based on SVM classification and region merging", computers in Biology and Medicine, 2009, NY, NY, US, vol. 39, No. 9, pp. 785-798, ISSN 0010-4825).*

Orozco et al ("A Hybrid Approach for Pap-Smear Cell Nucleus Extraction", Pattern Recognition, 2011, Springer Berlin Heidelberg, Berlin, Heidelberg, vol. 6718, pp. 174-183, ISBN 978-3-642-21586-5 ; ISBN 3-642-21586-6.*
Shishir Shah, (Automatic Cell Image Segmentation using a Shape-Classification Model, MVA2007 IAPR Conference on Machine Vision Applications, May 16-18, 2007, Tokyo, Japan).*
Zhaozheng et al (Cell segmentation in Microscopy imagery using Bag of local Bayesian Classifiers, 2010 IEEE, pp. 125-128).*
Santamaria-Pang A. et al., "Cell segmentation and classification via unsupervised shape ranking", 2013 IEEE 10th International Symposium on Biomedical Imaging, Apr. 7, 2013, pp. 406-409.
Marcuzzo M., et al., "Automated *Arabidopsis* plant root cell segmentation based on SVM classification and region merging", Computers in Biology and Medicine, Sep. 1, 2009, New York, NY, US, vol. 39, No. 9, pp. 785-793.
Orozco-Monteagudo M. et al., "A Hybrid Approach for Pap-Smear Cell Nucleus Extraction", Pattern Recognition, Jun. 29, 2011, Springer Berlin Heidelberg, vol. 6718, pp. 174-183.

(Continued)

*Primary Examiner* — Amara Abdi
(74) *Attorney, Agent, or Firm* — Eileen B. Gallagher

(57) ABSTRACT

A method of segmenting a digital image of biological tissue includes accessing a ranking model calculated from training data representing shapes of conforming and non-conforming biological unit exemplars. The ranking model may include support vectors defining a hyperplane in a vector space. The method further includes accessing image data representing the digital image, identifying a first shape and a set of second constituent shapes in the digital image, wherein the first shape comprises a union of the set of second constituent shapes, determining a rank of a first data point in the image data corresponding to the first shape and a rank of a second data point in the image data corresponding to the set of second constituent shapes into the vector space, and segmenting the digital image using the first shape or the set of second constituent shapes based on which data point has a greater respective rank.

25 Claims, 18 Drawing Sheets

(56) References Cited

OTHER PUBLICATIONS

Wahlby C. et al., "Algorithms for Cytoplasm Segmentation of Fluorescence Labelled Cells", Analytical Cellular Pathology, Jan. 1, 2002, Elsevier Science, Amsterdam, NL, vol. 24, No. 2/03, pp. 101-111.
Search Report and Written Opinion from corresponding PCT Application No. PCT/SE2013/051225 dated Apr. 16, 2014.
Aldon et al., A new shape segmentation approach for active vision systems in Computer Vision and Pattern Recognition, 1991. Proceedings CVPR '91., IEEE Computer Society Conference on, pp. 708-709, Jun. 1991.
Atiq et al., Vehicle detection and shape recognition using optical sensors: A review. In Machine Learning and Computing (ICMLC), 2010 Second International Conference on, pp. 223-227,Feb. 2010.
Baatz et al., Multiresolution segmentation: an optimization approach for high quality multi-scale image segmentation. Journal of Photogrammetry and Remote Sensing, 58(3-4):1223, 2000.
Bamford, Empirical comparison of cell segmentation algorithms using an annotated dataset. In Image Processing, 2003. ICIP 2003. Proceedings. 2003 International Conference on, vol. 2, pp. II-1073-6 vol. 3, Sep. 2003.
Bamford, "Automating Cell Segmentation Evaluation with Annotated Examples", The University of Queensland, 2003.
Barash et al., Multiplexed analysis of proteins in tissue using multispectral fluorescence imaging. Medical Imaging, IEEE Transactions on, 29(8):1457-1462, Aug. 2010.
Belongie et al., Shape matching and object recognition using shape contexts. IEEE Trans. Pattern Anal. Mach. Intell., 24:509-522, Apr. 2002.
Can et al., A unified segmentation method for detecting subcellular compartments in immunofluorescently labeled tissue images. In: Microscopic Image Analysis with Applications in Biology. (2009).
Chang et al., LIBSVM: A library for support vector machines. ACM Transactions on Intelligent Systems and Technology 2 (2011) 27:1-27:27 Software available at http://www.csie.ntu.edu.tw/~ cjlin/libsvm.
Cheng et al., Microscopic cell detection based on multiple cell image segmentations and fusion algorithms. In Biomedical Engineering and Informatics, 2009. BMEI '09. 2nd International Conference on, pp. 1-7, Oct. 2009.
Cheng et al., Discriminative segmentation of microscopic cellular images. In Fichtinger, G., Martel, A., Peters, T., eds.: Medical Image Computing and Computer-Assisted Intervention—MICCAI 2011. vol. 6891 of Lecture Notes in Computer Science., Springer (2011) 637-644.
Conrad et al., "Automated Microscopy for High-Content RNAi Screening", JCB—Journal of Cell Biology,vol. 188, Issue 4 , pp. 453-461, 2010.
El Adawy et al., A fast algorithm for segmentation of microscopic cell images. In Information Communications Technology, 2006. ICICT '06. ITI 4th International Conference on, p. 1, Dec. 2006.
Fenistein et al., "A Fast, Fully Automated Cell Segmentation Algorithm for High-Throughput and High-Content Screening", Cytometry Part A the journal of the International Society for Analytical Cytology, vol. 73, Issue 10, pp. 958-964, Oct. 2008.
Fish, "Analysis for Breast Cancer", Bioview, Product catalogue, FDA Clearance: Jan. 24, 2007.
Guocheng et al., Shape filling rate for silhouette representation and recognition. In Pattern Recognition (ICPR), 2010 20th International Conference on, pp. 507-510, Aug. 2010.
Held et al., "Using Multimodal Information for the Segmentation of Fluorescent Micrographs with Application to Virology and Microbiology", Annual International Conference of the IEEE Engineering in Medicine and Biology Society, EMBC, pp. 6487-6490, Aug. 30, 2011-Sep. 3, 2011,Location: Boston, MA.
Helen et al., Segmentation of pulmonary parenchyma in ct lung images based on 2d otsu optimized by pso. In Emerging Trends in Electrical and Computer Technology (ICETECT), 2011 International Conference on, pp. 536-541, Mar. 2011.
Ibanez et al., The ITK Software Guide. Kitware, Inc. ISBN 1-930934-15-7, http://www.itk.org/ItkSoftwareGuide.pdf. Second edn. (2005).
Keuper et al., "Hierarchical Markov Random Fields for Mast Cell Segmentation in Electron Microscopic Recordings", Max-Planck Institute for Immunobiology, Mar. 18, 2011.
Kong et al., Partitioning histopathological images: An integrated framework for supervised color-texture segmentation and cell splitting. Medical Imaging, IEEE Transactions on, pp. (99):1, 2011.
Kumar et al., . Personal recognition using hand shape and texture. Image Processing, IEEE Transactions on, 15 (8):2454-2461, Aug. 2006.
Lee et al., A fast and robust approach for automated segmentation of breast cancer nuclei. In In Proceedings of the IASTED International Conference on Computer Graphics and Imaging, pp. 42-47. ACTA Press, 1999.
Liao et al., Composite sketch shape recognition based on dagsvm and decision tree. In Machine Learning and Cybernetics, 2006 International Conference on, pp. 3254-3259, Aug. 2006.
Lin et al., "A Multi-Model Approach to Simultaneous Segmentation and Classification of Heterogeneous Populations of Cell Nuclei in 3D Confocal Microscope Images", Cytometry Part A the journal of the International Society for Analytical Cytology, vol. 71A, Issue 9, pp. 724-736, Sep. 2007.
Martinez et al., Bubble segmentation based on shape from shading for in-situ microscopy. In Electrical Communications and Computers (CONIELECOMP), 2011 21st International Conference on, pp. 1-4, Mar. 2-28, 2011.
Mori et al., Efficient shape matching using shape contexts. IEEE Transactions on Pattern Analysis and Machine Intelligence 27(11) (Nov. 2005) 1832-1837.
Mukherjee et al., Segmentation of circular and rectangular shapes in an image using helmholtz principle. In Computer Vision, Graphics Image Processing, 2008. ICVGIP '08. Sixth Indian Conference on, pp. 657-664, Dec. 2008.
Na et al., The segmentation of overlapping milk somatic cells based on improved watershed algorithm. In Artificial Intelligence and Computational Intelligence, 2009. AICI '09. International Conference on, vol. 3, pp. 563-566, Nov. 2009.
Oh et al., Bayesian shape recognition using principle component analysis and modified chain codes. In Control, Automation and Systems, 2008. ICCAS 2008. International Conference on, pp. 2138-2141, Oct. 2008.
Orikawa et al., Cell segmentation from phase-contrast images using hybrid watershed and region growing algorithm for genomic drug discovery. In SICE Annual Conference 2010, Proceedings of, pp. 84-88, Aug. 2010.
Park et al., Automatic cell segmentation in microscopic color images using ellipse fitting and watershed. In Complex Medical Engineering (CME), 2010 IEEE/ICME International Conference on, pp. 69-74, Jul. 2010.
Ray et al., Data acceptance for automated leukocyte tracking through segmentation of spatiotemporal images. Biomedical Engineering, IEEE Transactions on, 52(10):1702-1712, Oct. 2005.
Reniers et al., Skeleton-based hierarchical shape segmentation. In Shape Modeling and Applications, 2007. SMI '07. IEEE International Conference on, pp. 179-188, Jun. 2007.
Siddiqi et al., Area and length minimizing flows for shape segmentation. In Computer Vision and Pattern Recognition, 1997. Proceedings., 1997 IEEE Computer Society Conference on, pp. 621-627, Jun. 1997.
Suresh et al., Analysis of segmentation and tracking algorithms for time lapse microscopic progenitor cell images. In Signal and Image Processing (ICSIP), 2010 International Conference on, pp. 453-456, Dec. 2010.
Toennies et al.,. A weight-adaptive dynamic model for shape segmentation. In Image Processing, 2005. ICIP 2005. IEEE International Conference on, vol. 2, pp. II-814-17, Sep. 2005.
Valmianski et al., "Automatic Identification of Fluorescently Labeled Brain Cells for Rapid Functional Imaging", Journal of Neurophysiology—Innovative methodology, 2010.

(56) References Cited

OTHER PUBLICATIONS

Wang et al., A modified watersheds image segmentation algorithm for blood cell. In Communications, Circuits and Systems Proceedings, 2006 International Conference on, vol. 1, pp. 450-454, Jun. 2006.

Wang et al., Detection and segmentation of generic shapes based on affine modeling of energy in eigenspace. Image Processing, IEEE Transactions on, 10(11):1621-1629, Nov. 2001.

Wang et al., Conformal geometry and its applications on 3d shape matching, recognition, and stitching. Pattern Analysis and Machine Intelligence, IEEE Transactions on, 29(7):1209-1220, Jul. 2007.

Wang et al., "Novel Cell Segmentation and Online Svm for Cell Cycle Phase Identification in Automated Microscopy", Oxford Journals—Life Sciences & Mathematics & Physical Sciences—Bioinformatics, vol. 24, Issue 1, pp. 94-101, 2007.

Wenhua et al., White blood cell segmentation and extraction based on histogram multi-threshold and lifting wavelet. In Electric Technology and Civil Engineering (ICETCE), 2011 International Conference on, pp. 4730-4732, Apr. 2011.

Wollman et al., High throughput microscopy: from raw images to discoveries. J Cell Sci, 120(21):3715-3722, Nov. 2007.

Xiao et al., Symmetry-based presentation for stem-cell image segmentation. In: Computational Advances in Bio and Medical Sciences (ICCABS), 2011 IEEE 1st International Conference on. (Feb. 2011) 196-201.

Xiao-Jing et al., A new algorithm for watershed segmentation of cells in marrow. In Engineering in Medicine and Biology Society, 2005. IEEE-EMBS 2005. 27th Annual International Conference of the,pp. 6456-6459, Jan. 2005.

Xiong et al., Learning cell geometry models for cell image simulation: An unbiased approach. In Image Processing (ICIP), 2010 17th IEEE International Conference on, pp. 1897-1900, Sep. 2010.

Yasmin et al., Robust segmentation algorithm using log edge detector for effective border detection of noisy skin lesions. In Computer, Communication and Electrical Technology (ICCCET), 2011 International Conference on, pp. 60-65, Mar. 2011.

Zacharia et al., 3-d spot modeling for automatic segmentation of cdna microarray images. NanoBioscience, IEEE Transactions on, 9(3):181-192, Sep. 2010.

Zhu-Jacquot, Graph cuts segmentation with geometric shape priors for medical images. In Image Analysis and Interpretation, 2008. SSIAI 2008. IEEE Southwest Symposium on, pp. 109-112, Mar. 2008. June.

* cited by examiner

BIOLOGICAL UNIT IDENTIFICATION BASED ON SUPERVISED SHAPE RANKING

FIELD

Embodiments relate generally to analysis of digital images, and more particularly, to analysis of digital images of biological tissue samples.

BACKGROUND

The term segmentation, as used herein, refers to the identification of boundaries of biological units, such as cells, within a digital image. The digital image may be obtained using a microscope. Weak or data driven segmentations may be used to define cell boundaries. For example, a watershed transform is one image processing technique that has been used for segmenting images of cells. With the watershed transform, a digital image may be modeled as a three-dimensional topological surface, where values of pixels (e.g., brightness or grey level) in the image represent geographical heights.

Due to variations in the histology of different tissue types, however, weak segmentations may not produce an accurate segmentation without significant adaptation and optimization to specific tissue type applications. For example, a weak segmentation algorithm may cause the image to be over-segmented (e.g., what appears as a single cell may actually be only a portion of a cell) or under-segmented (e.g., what appears as a single cell may actually be several different cells in combination). Furthermore, the image may not be properly segmented with a weak segmentation algorithm, in part, because a suitable segmentation parameter for one region of the image may not work well in other regions of the same image. Therefore, a weak segmentation algorithm may not be robust enough for segmentation of large numbers of cells having many morphological variations.

SUMMARY

One embodiment is directed to a computer-implemented method of segmenting a digital image of biological tissue. The computer includes a processor and a memory operatively coupled to the processor. The method includes accessing, in the memory, a plurality of support vectors calculated from training data representing shapes of conforming biological unit exemplars and shapes of non-conforming biological unit exemplars, the plurality of support vectors defining a hyperplane in a vector space. The method further includes accessing, in the memory, image data representing the digital image of biological tissue, identifying, by the processor, a first shape and a set of second constituent shapes in the digital image using the image data, mapping, by the processor, a first data point in the image data corresponding to the first shape and a second data point in the image data corresponding to the set of second constituent shapes into the vector space, and segmenting, by the processor, the digital image using the first shape or the set of second constituent shapes based on which of the first data point and the second data point has a greater respective signed distance from the hyperplane. The first shape comprises a union of the set of second constituent shapes. In some embodiments, each segment of the digital image may represent a cell.

In some embodiments, the method may include displaying, on a display operatively coupled to the processor, the segmented digital image using a color coding of each cell, where the color coding represents a quality of the segmentation.

In some embodiments, the digital image may be segmented using the first shape where the signed distance between the hyperplane and the first data point is greater than the signed distance between the hyperplane and the second data point. In some embodiments, the digital image may be segmented using the set of second constituent shapes where the signed distance between the hyperplane and the second data point is greater than the signed distance between the hyperplane and the first data point.

In some embodiments, the method may include an act of storing the training data in the memory. In some embodiments, the method may include computing the plurality of support vectors using the processor. In some embodiments, the method may include computing, by the processor, a linear combination of each shape in the set of second constituent shapes. The second data point may correspond to the linear combination. The linear combination may, but need not, be applied to the kernel transformation related to the support vector machine.

In some embodiments, the first shape and the linear combination of each shape in the set of second constituent shapes may each be represented in the image data as a histogram of points corresponding to a boundary of the first shape and linear combination, respectively, each point being located on a polar coordinate plane. The method may include computing, by the processor, the first data point and the second data point using the histogram corresponding to the first shape and the linear combination, respectively. In some embodiments, the method may include rotating each of the first shape and the linear combination of the set of second constituent shapes such that an axis of least inertia of the respective shape coincides with a zero degree radial of the polar coordinate plane prior to computing the first data point and the second data point. The axis of least inertia may include a line from which the integral of the square of distances to each point on the boundary of the respective shape is a minimum.

In some embodiments, the method may include applying, by the processor, a weak segmentation algorithm to the image data with certain parameters, for example, a watershed transform at a predetermined flooding level.

In some embodiments, the method may include identifying, by the processor, a set of third constituent shapes in the digital image using the image data. At least one shape in the set of second constituent shapes may comprise a union of the set of third constituent shapes. The method may further include mapping, by the processor, a third data point corresponding to the set of third constituent shapes into the vector space. The act of segmenting may include segmenting the digital image using the first shape, the set of second constituent shapes or the set of third constituent shapes based which of the first data point, the second data point and the third data point has a greater respective signed distance from the hyperplane.

In some embodiments, the digital image may be segmented using the first shape where the signed distance between the hyperplane and the first data point is greater than either the signed distance between the hyperplane and the second data point and the signed distance between the hyperplane and the third data point. The digital image may be segmented using the set of second constituent shapes where the where the signed distance between the hyperplane and the second data point is greater than either the signed distance between the hyperplane and the first data point and the signed distance between the hyperplane and the third data point. The digital image may be segmented using the set of third constituent shapes where the signed distance between the hyperplane and the third data point is greater than either the signed distance between the hyperplane and the first data point and the signed distance between the hyperplane and the second data point.

In some embodiments, the method may include applying, by the processor, a weak segmentation algorithm to the image data with certain parameters, for example, a watershed transform at a predetermined flooding level.

In one embodiment, a non-transitory computer-readable medium has stored thereon computer-executable instructions that when executed by a computer cause the computer to access a plurality of support vectors calculated from training data representing shapes of conforming biological unit exemplars and shapes of non-conforming biological unit exemplars, access image data representing a digital image of biological tissue, identify a first shape and a set of second constituent shapes in the digital image using the image data, wherein the first shape comprises a union of the set of second constituent shapes, map a first data point in the image data corresponding to the first shape and a second data point in the image data corresponding to the set of second constituent shapes into the vector space, and segment the digital image using one of the first shape and the set of second constituent shapes based on which of the first data point and the second data point has a greater respective signed distance from a hyperplane. The plurality of support vectors define the hyperplane in a vector space.

In some embodiments, the non-transitory computer-readable medium may include computer-executable instructions that when executed by the computer cause the computer to apply a weak segmentation algorithm to the image data at a predetermined flooding level to produce the set of second constituent shapes.

In one embodiment, a system for segmenting a digital image of biological tissue includes a processor, an input coupled to the processor and configured to receive image data representing the digital image of biological tissue, and a memory coupled to the processor. The memory includes computer-executable instructions that when executed by the processor cause the processor to access a plurality of support vectors based on training data representing shapes of conforming biological unit exemplars and shapes of non-conforming biological unit exemplars, identify a first shape and a set of second constituent shapes in the digital image using the image data representing the digital image of biological tissue, wherein the first shape comprises a union of the set of second constituent shapes, map a first data point in the image data corresponding to the first shape and a second data point in the image data corresponding to the set of second constituent shapes into the vector space, and segment the digital image using one of the first shape and the set of second constituent shapes based on which of the first data point and the second data point has a greater respective signed distance from a hyperplane. The plurality of support vectors defines the hyperplane in a vector space.

In some embodiments, the digital image may be segmented using the first shape where the where the signed distance between the hyperplane and the first data point is greater than the signed distance between the hyperplane and the second data point. In some embodiments, the digital image may be segmented using the set of second constituent shapes where the signed distance between the hyperplane and the second data point is greater than the signed distance between the hyperplane and the first data point.

In some embodiments, the memory may include computer-executable instructions that when executed by the processor cause the processor to apply a weak segmentation algorithm to the image data with certain parameters, for example, a watershed transform at a predetermined flooding level, to produce the set of second constituent shapes. In some embodiments, the memory may further include computer-executable instructions that when executed by the processor cause the processor to compute a linear combination of each shape in the set of second constituent shapes, wherein the second data point corresponds to the linear combination.

In some embodiments, the first shape and the linear combination of each shape in the set of second constituent shapes may each be represented in the image data as, but not limited to, a histogram of points corresponding to a boundary of the first shape and linear combination, respectively, each point being located on a polar coordinate plane. The histogram may contain appearance information besides the shape information. Appearance information may include texture and intensity-based measurements. The memory may include computer-executable instructions that when executed by the processor cause the processor to compute the first data point and the second data point using the histogram corresponding to the first shape and the linear combination, respectively. In some embodiments, the memory may include computer-executable instructions that when executed by the processor cause the processor to rotate each of the first shape and the linear combination of the set of second constituent shapes such that an axis of least inertia of the respective shape coincides with a zero degree radial of the polar coordinate plane prior to computing the first data point and the second data point, the axis of least inertia including a line from which the integral of the square of distances to each point on the boundary of the respective shape is a minimum.

BRIEF DESCRIPTION OF THE DRAWINGS

Features and aspects of embodiments are described below with reference to the accompanying drawings, in which elements are not necessarily depicted to scale.

DETAILED DESCRIPTION

Embodiments are directed to systems and methods of segmenting biological units in a digital image of biological tissue. The digital image may be obtained, for example, using a microscope and a camera. The term biological unit, as used herein, refers to discrete biological structures and portions, components or combinations of biological structures in the digital image. The target biological units in the digital image may include, but are not necessarily limited to, cells. Exemplary target cells may include, for example, i) epithelial cells and/or stromal cells, or ii) necrotic cells.

Figure 1:
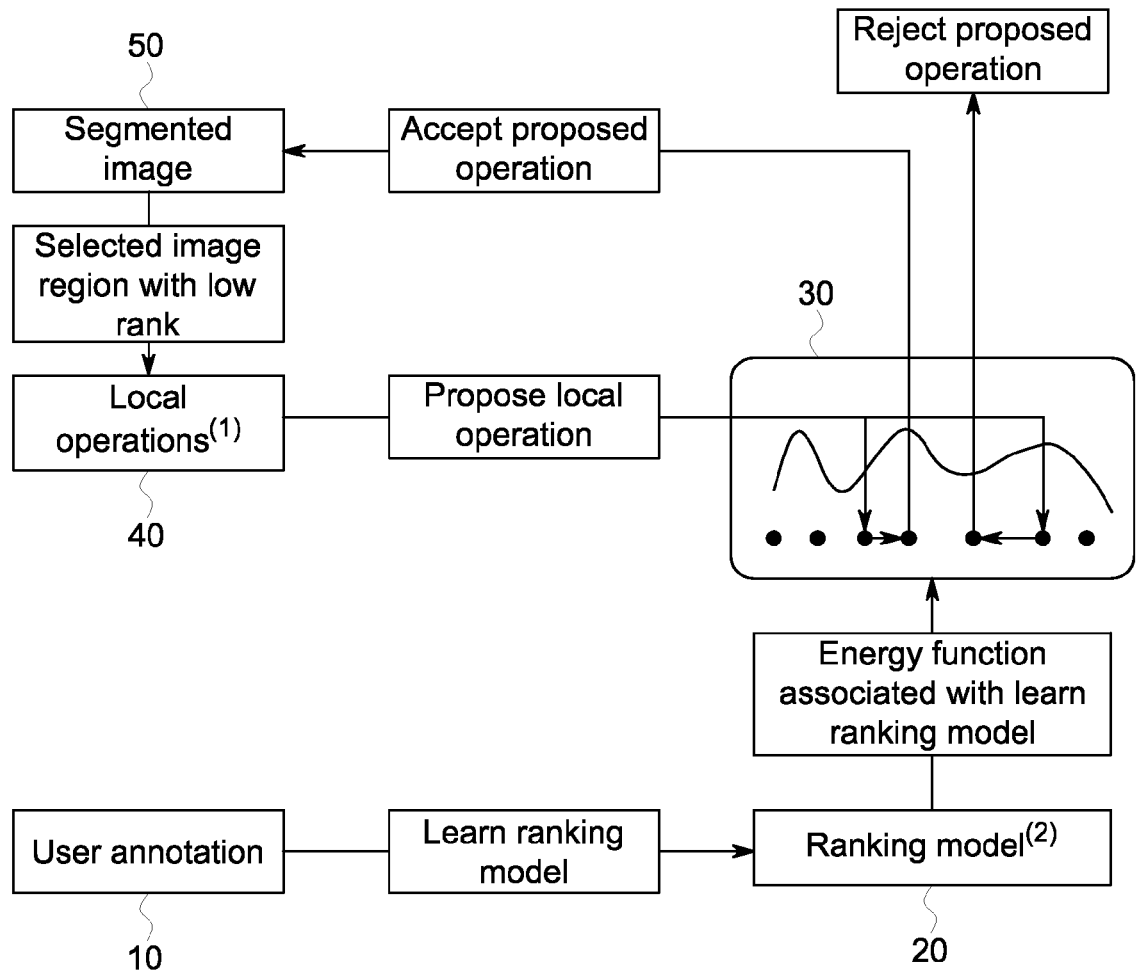
FIG. 1 depicts one example of a method of segmenting a digital image of biological tissue, in accordance with one embodiment.

Histology patterns vary depending the type of biological tissue being examined. Therefore, it may be necessary to adapt and/or optimize segmentation algorithms for specific tissue types. FIG. 1 depicts a schematic diagram of one example of a method of segmenting a digital image of biological tissue, according to one embodiment. The exemplary method provides an adaptive segmentation process that is based on a ranking of the biological units in the digital image.

Given a training set of biological units, a user may rank each biological unit in the training set to generate a set of user annotations 10. For example, the user may rank the shape of each biological unit in the training set as "best," "medium," or "worst" in terms of the quality of shape of the biological unit, or "conforming" or "non-conforming" based on the quality of the shape. The user annotations 10 may then be used to learn a classifier or ranking model 20. The classifiers in the ranking model 20 may include, for example, Random Forest, Markov Random Field, Bayesian Networks, Belief Propagation, Support Vector Machines, Structural Support Vector Machines, and/or Kernel Methods. The ranking model 20 may be associated with a function 30 describing the energy or cost relationships between differently classified biological units. These relationships may, for example, provide a quality measure to be used as a basis of comparison with biological units in the target sample in the digital image.

One or more local operations 40 are defined by a set of rules that may be applied to each biological unit identified at a particular scale level of an initially weakly segmented image 50. The local operations 40 may include, for example, split, merge or erase operations performed on a hierarchical set of segmentations, such as described below with respect to FIGS. 6A-6C, or using a library of predefined segmentations. The segmentation of the digital image may be optimized by accepting the local operations 40 having the lowest energy level or cost, according to the function 30, that increase the rank of the biological units identified in the proposed segmentation. Biological units in the proposed segmentation having a higher rank than biological units in different segmentations of the hierarchy have shapes that are most similar to the shapes of the "best" or "conforming" biological units in the training data. Local operations 40 that decrease the rank may be rejected.

Figure 2A:
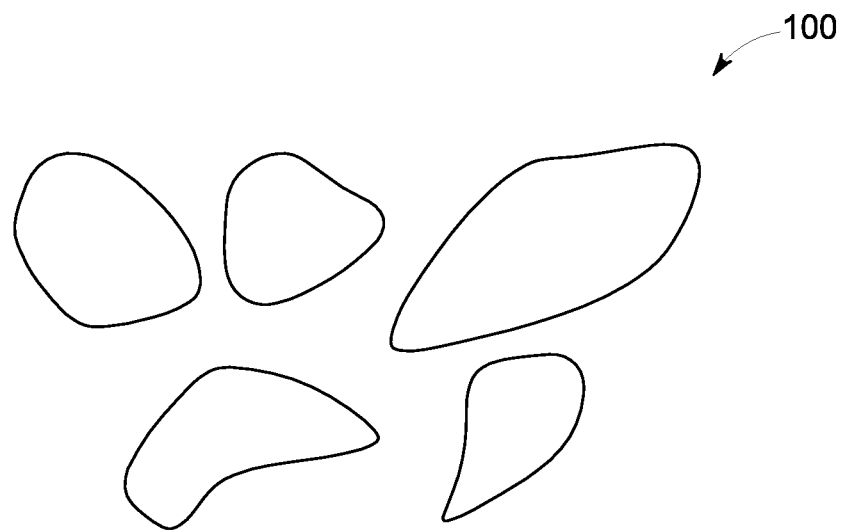
FIG. 2A depicts one example of a class of biological unit exemplars in a training set, in accordance with one embodiment.
Figure 2B:
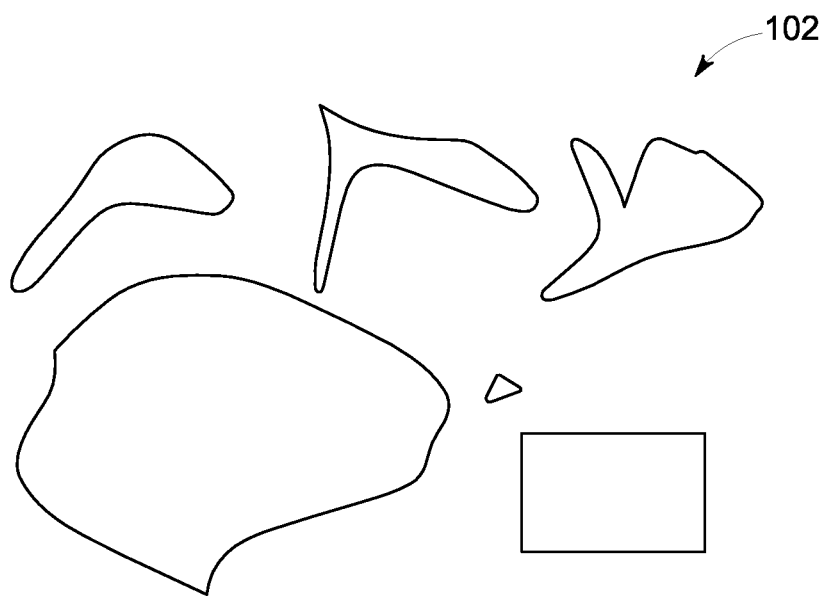
FIG. 2B depicts one example of a class of non-biological unit exemplars in the training set, in accordance with one embodiment.

In some embodiments, a method of segmenting a digital image of biological tissue includes accessing a plurality of support vectors calculated from training data. Support vectors are used by support vector machines for classifying and analyzing data. A support vector machine is a concept in statistics and computer science for analyzing data and recognizing patterns with supervised learning methods. Such a support vector machine may be used to predict for each input which of one, two or more possible classes the input falls into (i.e., a non-probabilistic binary or multi-class classifier) based on training exemplars of the one, two or more classes. In one embodiment, the training data represents various shapes in each of one, two or more classes of exemplary shapes. FIG. 2A depicts a portion of a class of exemplars 100 representing shapes that are cell-like (i.e., conforming shapes) and represent good segmentation. FIG. 2B depicts a portion of a class of exemplars 102 representing shapes that are un-cell-like (i.e., non-conforming shapes) and represent poor segmentation. The support vectors represent exemplars in both classes (e.g., conforming and non-conforming) of the training data mapped into a vector space, and may be used to define a hyperplane in the vector space. The hyperplane is a line or curve separating one portion of the vector space containing one class of support vectors from another portion of the vector space containing another class of support vectors for classifying the good and bad segmentation.

The method further includes identifying a first shape and a set of second constituent shapes in the digital image. The shapes represent cells segmented at different scale levels using a weak segmentation algorithm (such as a watershed transform) for constructing a hierarchical segmentation of the digital image. For example, the first shape may comprise a union of the set of second constituent shapes. A first data point representing the first shape is mapped into the vector space, and a second data point representing the set of second constituent shapes (e.g., a mean of the shapes in the set) is also mapped into the vector space. The signed distance between the first data point and the hyperplane is compared to the signed distance between the second data point and the hyperplane. An optimum, or more optimal, segmentation of the digital image may be obtained using either the first shape of the set of second constituent shapes based on whether the first data point or the second data point has a greater respective signed distance from the hyperplane.

Figure 3:
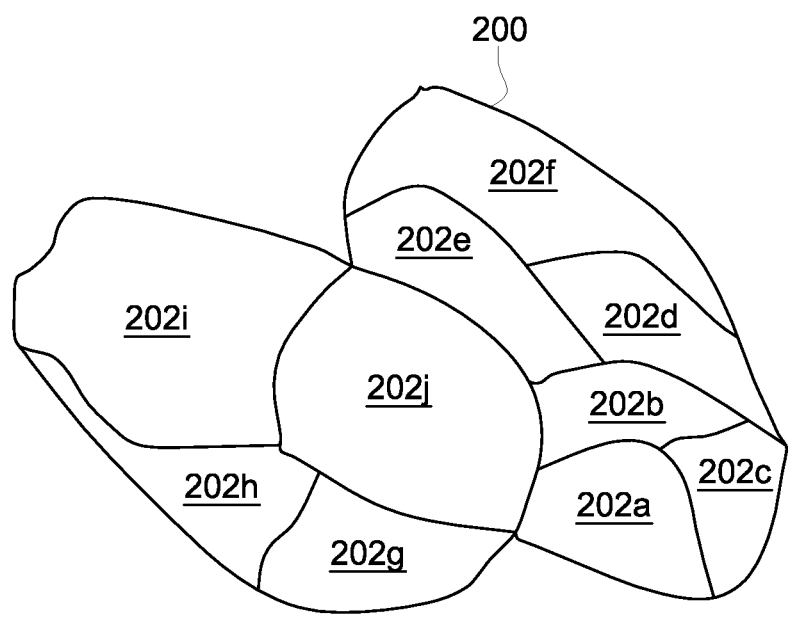
FIG. 3 depicts one example of a digital image of cells segmented at one segmentation scale level, in accordance with one embodiment.

FIG. 3 depicts one example of cell segmentation of a two-dimensional shape 200 at one scale level, according to one embodiment. The two-dimensional shape 200 is represented as a closed and simple curve in Euclidean space. The interior and outermost boundary of the closed curve 200 represents a single segment in the digital image at a higher scale level than depicted in FIG. 3. Depending on the accuracy of the segmentation, the shape 200 may include a cell (i.e., the shape 200 is optimally segmented), a portion of a cell (i.e., the shape 200 is over-segmented), or several cells in combination (i.e., the shape 200 is under-segmented). As will be discussed below, the optimal segmentation of cells in the image may be obtained by comparing the similarity of the segment shapes at two or more different segmentation scale levels to the training data. In this example, the shape 200 may be subdivided into a plurality of mutually-exclusive, non-overlapping constituent shapes 202a-202j representing segmentation at a different scale level than the scale level of the singular shape 200. In other words, the shape 200 may be expressed as the union of the constituent shapes 202a-202j.

In one embodiment, cell segmentation may be posed as an optimization problem where the cumulative cost of each shape in the image is minimized according to:

$$\min \sum_{i,l} Cost(C_i^l) \quad (1)$$

where C is the set of i curves (also referred to herein as shapes or cell segments) at scale level l.

Minimizing Eq. (1) is an NP-hard optimization problem, given that the number of different shape-to-shape combinations grows exponentially as the number of scale levels and segments increase. To reduce complexity, Eq. (1) may be minimized by constraining the number of segmentation combinations such that a subset of shapes at one segmentation scale level are contained in one and only one shape at the next adjacent segmentation scale level, i.e., a shape at one scale level is the union of a subset of shapes at an adjacent lower level. Referring to FIG. 3, for example, the shape 200 is the union of the constituent shapes 202a-202j under this constraint.

In one embodiment, the boundaries or shapes and scales of cells may be identified based on a predetermined shape descriptor. The shape descriptor may be used to define a measure of similarity between shapes in the image and the exemplars in the training data.

Figure 4A:
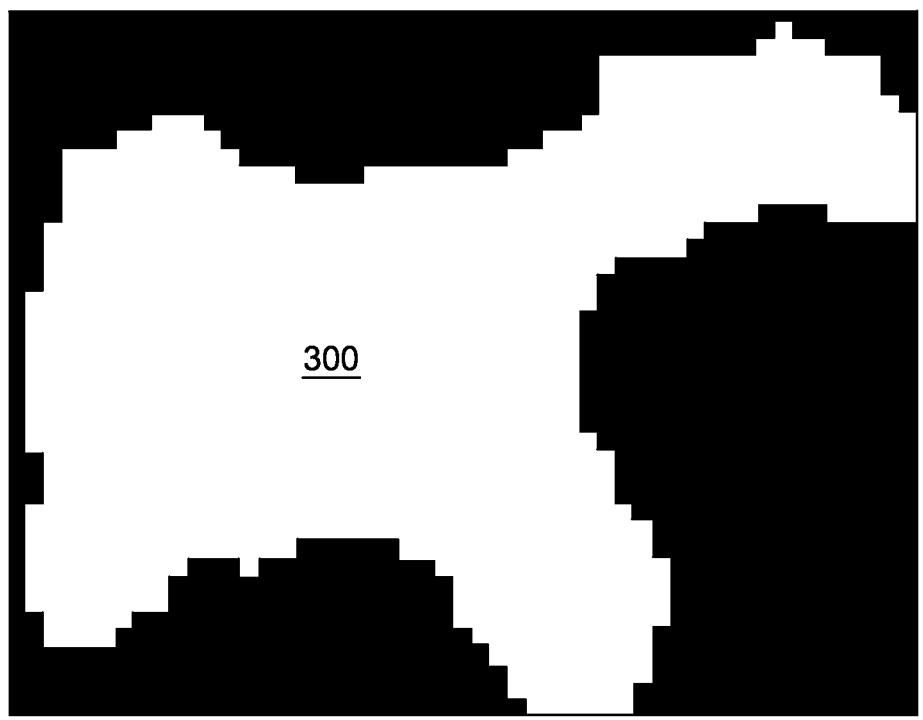
FIG. 4A depicts one example of a digital image of a cell as detected using a shape descriptor, in accordance with one embodiment.
Figure 4B:
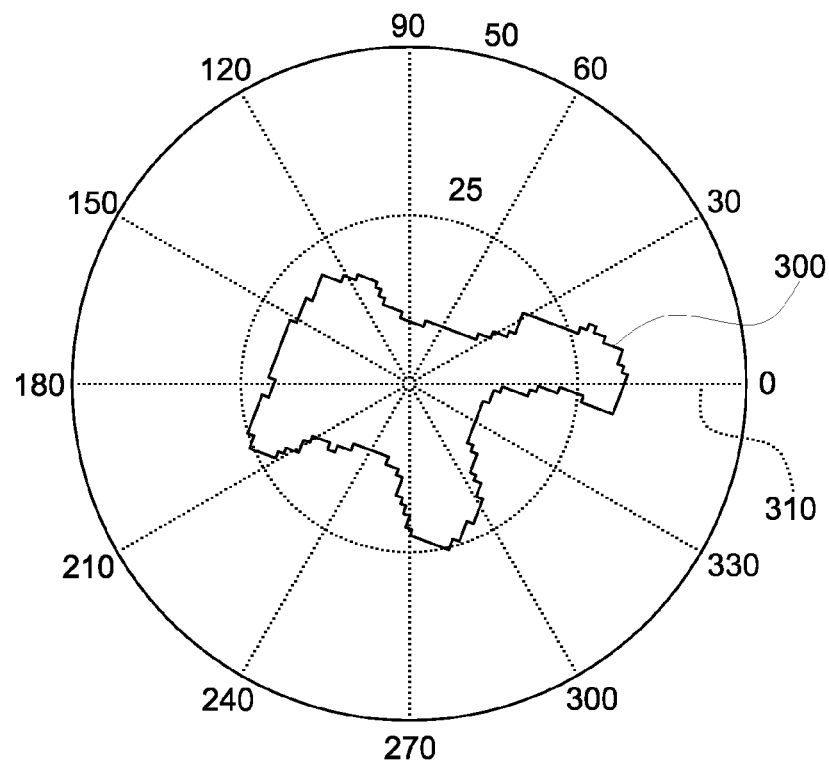
FIG. 4B depicts the cell of FIG. 4A oriented with respect to a polar coordinate plane, in accordance with one embodiment.
Figure 4C:
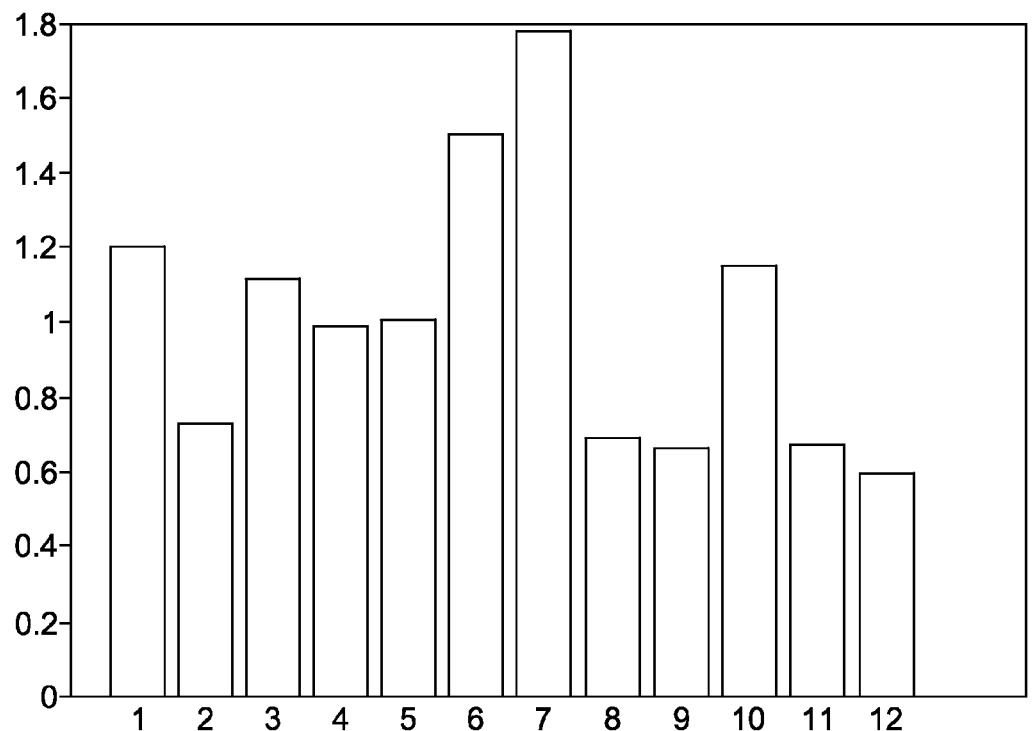
FIG. 4C depicts a histogram of boundary points of the cell depicted in FIG. 3B, in accordance with one embodiment.

The similarity in shape and scale between two cells in a digital image may be determined using a polar coordinate-based shape descriptor (e.g., a two-dimensional ring, such as described above, located in a polar coordinate plane). FIG. 4A depicts one example of a digital image of a cell 300. Initially, as depicted in FIG. 4B, the cell 300 may be rotated so that the zero degree radial 310 of the polar coordinate plane coincides with an orientation of the cell. The orientation of the cell, which is the axis of least inertia (ALI), may be defined as the line for which the integral of the square of the distances from the pole of the polar coordinate plane to each point on the boundary of the cell 300 is a minimum. After the cell 300 is oriented, the boundary points of the cell may be sampled using a morphological operation. For example, as illustrated in FIG. 4B, the polar coordinate plane may be divided into 12 30-degree bins. Each boundary point of the cell 300 may be represented in the polar coordinate system by a two-tuple ($\theta$, $\rho$), where $\theta$ denotes the angular coordinate of the boundary point and $\rho$ is the distance between the pole and the boundary point. A histogram of all boundary points, such as depicted in FIG. 4C, may be generated by projecting each point into a corresponding bin according to the following formula:

$$His(i) = \frac{1}{\sum_{\forall j} B(j)} \sum_{\forall \theta \in B(i)} \log\left(1 + \frac{1}{\rho}\right), \quad (2)$$

where B(i) denotes the degree interval of the ith bin and $$\frac{1}{\sum_{\forall j} B(j)}$$

is a normalization term. In FIG. 4C, the horizontal axis represents each of the 12 bins in the polar coordinate plane, and the vertical axis represents His(i) for each corresponding bin i. Because the shape descriptor is translation, rotation and scale variant, the logarithm function makes the shape descriptor more sensitive to the boundary points near to the pole than those of points far away.

For a given training set of shapes having one, two or more classes (e.g., a class of positive exemplars and a class of negative exemplars), a distance metric d can be defined as the projection of a given point with respect to the hyperplane, which as discussed above, separates the class of conforming support vectors from the class of non-conforming support vectors. Since the elements of the training dataset are linear separable, the hyperplane can be expressed in terms of the support vectors as:

$$w = \sum_i^{N_s} \alpha_i y_i x_i \quad (3)$$

where $N_s$ is the number of support vectors, $y_i$ is the corresponding class (e.g., conforming or non-conforming), $\alpha_i$ are the Lagrange multipliers. The signed distance function d(x) from any point in the vector space to the hyperplane is:

$$d(x) = \frac{\langle w, x \rangle + b}{\|w\|^2} = \frac{\sum_i^{N_s} \alpha_i y_i \langle x_i, x \rangle + b}{\left\|\sum_i^{N_s} \alpha_i y_i x_i\right\|^2}; \quad (4)$$

If d>0, then x is more similar to the conforming class, and if d<0, x is more similar to the non-conforming class. If $\phi: R^n \to H$ is a mapping from $R^n$ to the Hilbert space H and K is a kernel function defined as: $(x_i, x_j) = \langle \phi(x_i), \phi(x_j) \rangle$, then the signed distance function d(x) can be rewritten as:

$$d(x) = \frac{\sum_i^{N_s} \alpha_i y_i \langle \phi(x_i), \phi(x) \rangle + b}{\left\|\sum_i^{N_s} \alpha_i y_i \phi(x_i)\right\|^2} \quad (5)$$

According to one embodiment, the function d(x) as in Eq. (5) induces a ranking function that can be used to compare two shapes. For two shapes $C_A$ and $C_B$, $C_A$ is more similar to the conforming class than $C_B$ if $d(C_A) > d(C_B)$. Based on this, a similarity tree can be constructed. If $C_i^l = \cup C_j^{l-1}, \cap C_j^{l-1} = \emptyset$ then a subset of shapes at level l-1 in terms of a shape at level l as:

$$d(C_j^{l-1}) = d(C_j^l) + d(\Delta_j^{l-1}) \quad (6)$$

Eq. (6) can be rewritten as:

$$d(C_j^l) = \frac{\sum d(c_j^{l-1})}{n} - \frac{\sum d(\Delta_j^{l-1})}{n} = \mu(C_j^{l-1}) - \mu(\Delta_j^{l-1}), \quad (7)$$

where $$\mu(C_j^{l-1}) = d\left(\frac{\sum (c_j^{l-1})}{n}\right)$$

and $$\mu(\Delta_j^{l-1}) = d\left(\frac{\sum (\Delta_j^{l-1})}{n}\right).$$

The geometrical interpretation of $$\frac{\sum (c_j^{l-1})}{n}$$

and $$d\left(\frac{\sum (\Delta_j^{l-1})}{n}\right)$$

is the mean shape of the partition and the mean shape differences of the partitions with respect to the single shape, respectively. A many-to-one ranking function may be expressed in terms of the signed distance d(x) as:

$$d(\{C_1^l, \ldots, C_j^l\}) < \Delta d(C_i^l) \Leftrightarrow \mu(\Delta_j^{l-1}) > 0 \qquad (8)$$

Eq. (8) provides one example of an efficient way to compute similarities between subgroups of shapes in the image.

Figure 5A:
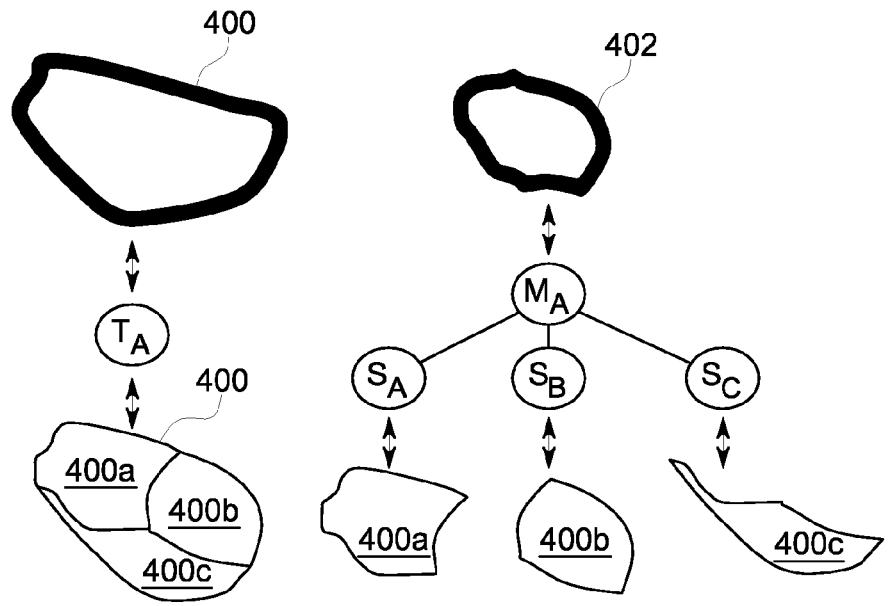
FIG. 5A depicts a comparison between one example of a cell segment and the mean of several cell segments, in accordance with one embodiment.
Figure 5B:
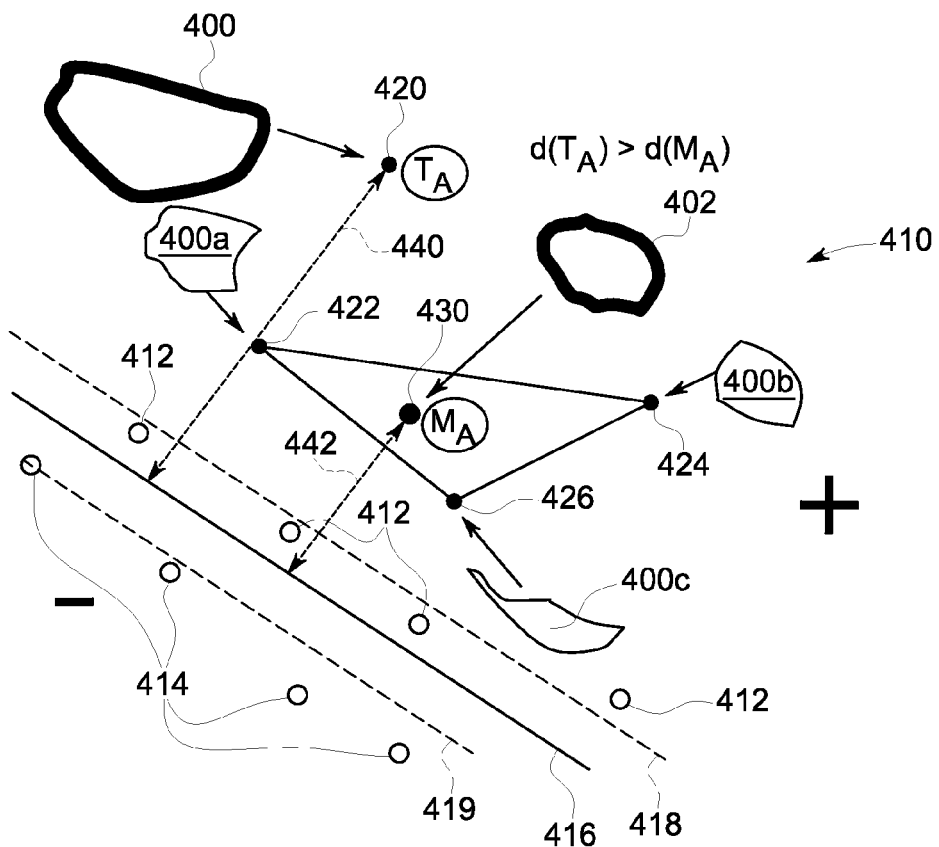
FIG. 5B depicts one example of a mapping of the cell segments of FIG. 5A into a vector space, in accordance with one embodiment.

According to one embodiment, FIG. 5A depicts a comparison between one example of a shape 400 and the mean shape 402 of shapes 400a, 400b and 400c. The shape 400 includes the union of shapes 400a, 400b and 400c, which represent segmentations at two consecutive scale levels, respectively. In other words, shapes 400a, 400b and 400c represent a segmentation at scale level l−1, and the shape 400 represents a different segmentation at scale level l, which is hierarchically one level above l−1. FIG. 5B depicts the mapping of shapes 400 and 402 into a vector space 410. A plurality of support vectors representing conforming shapes 412 and a plurality of support vectors representing non-conforming shapes 414 may be used to define a hyperplane 416 that separates the vector space 410 into two regions (marked as "+" for the conforming region and "−" for the non-conforming region). Dashed lines 418 and 419 represent margins about the hyperplane 416. A first data point 420 in the vector space 410 represents shape 400, which falls in the conforming region of the vector space 410. A second data point 430 in the vector space 410 represents the mean shape 402, which also falls in the conforming region of the vector space 410. For perspective, each of the shapes 400a, 400b and 400c is depicted at points 422, 424 and 426, respectively, in the vector space 410. A first signed distance 440 is the signed distance between the first data point 420 and the hyperplane 416, and a second signed distance 442 is the signed distance between the second data point 430 and the hyperplane 416. As can been seen in this example, the first signed distance 440 exceeds the second signed distance 442 because the first data point 420 is further from the hyperplane 416 in the conforming region than the second data point 430.

Figure 6A:
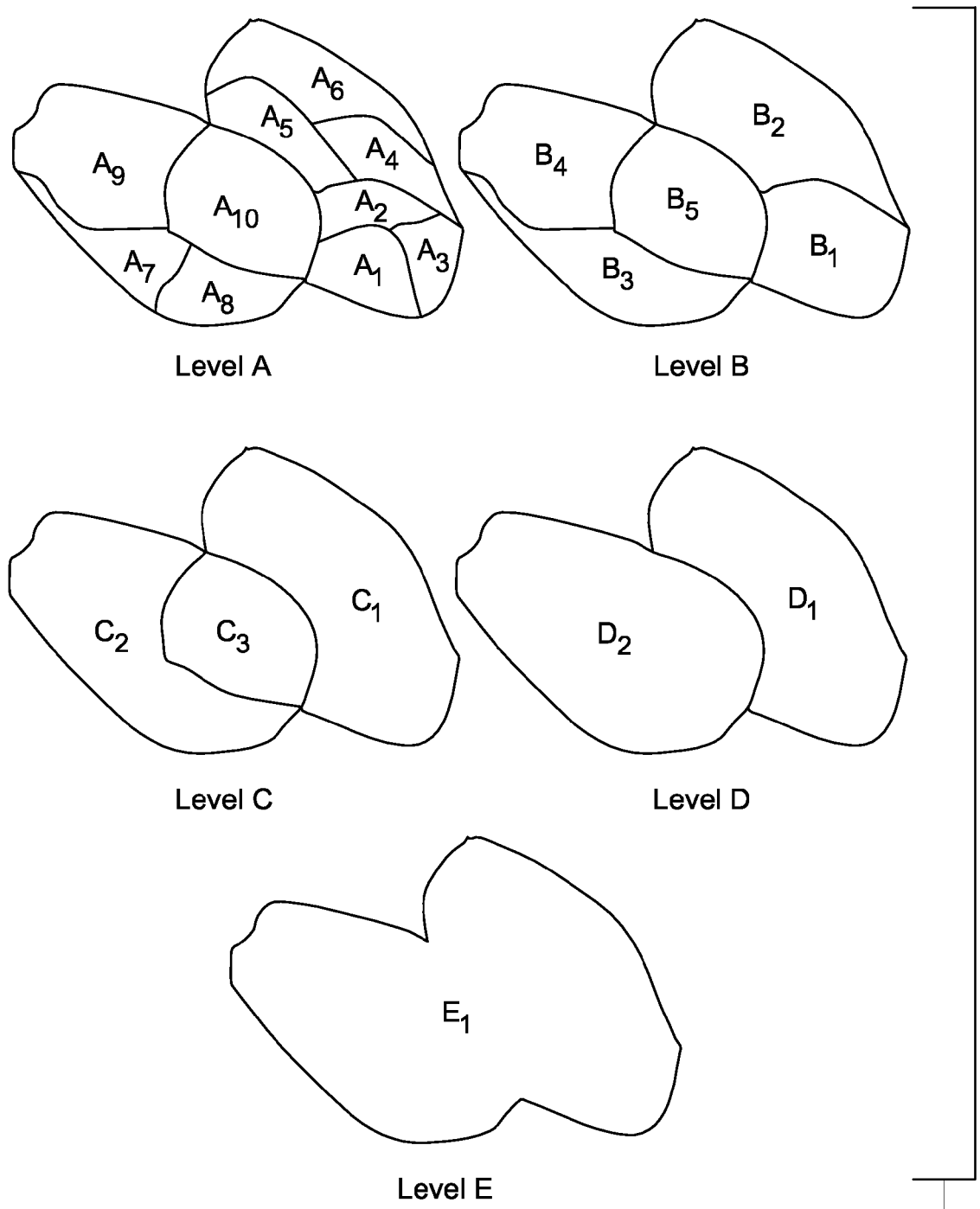
FIG. 6A depicts one example of a five-level hierarchical segmentation of a portion of a digital image of cells, in accordance with one embodiment.

As discussed above with respect to FIG. 3, in some embodiments, topological constraints may be imposed on a weak segmentation at different scale levels and with different paramters. FIG. 6A depicts one example of a five-level hierarchical segmentation of a portion of a digital image of biological tissue, according to an embodiment. It will be appreciated that any number of levels and parameters of a weak segmentation may be used. In this example, each level A through E represents a different level of segmentation, where level E is the highest level in which there is only one shape and level A is the lowest level, which includes many constituent shapes. Intermediate levels B, C and D each include various combinations of constituent shapes from the adjacent level. Topological constraints may be imposed for minimizing Eq. (1) in which each shape at one segmentation scale level is included in one and only one shape at an adjacent segmentation scale level. For example, in FIG. 6A, shape $B_1$, which is one shape at scale level B, is the union of shapes $A_1$, $A_2$ and $A_3$, which are shapes at an adjacent (lower) scale level A. Furthermore, the intersection of shapes $A_1$, $A_2$ and $A_3$ at scale level A with any shapes at scale level B other than shape $B_1$ is an empty set. In this embodiment, these topological constraints apply to all shape segments at all scale levels.

Figure 6B:
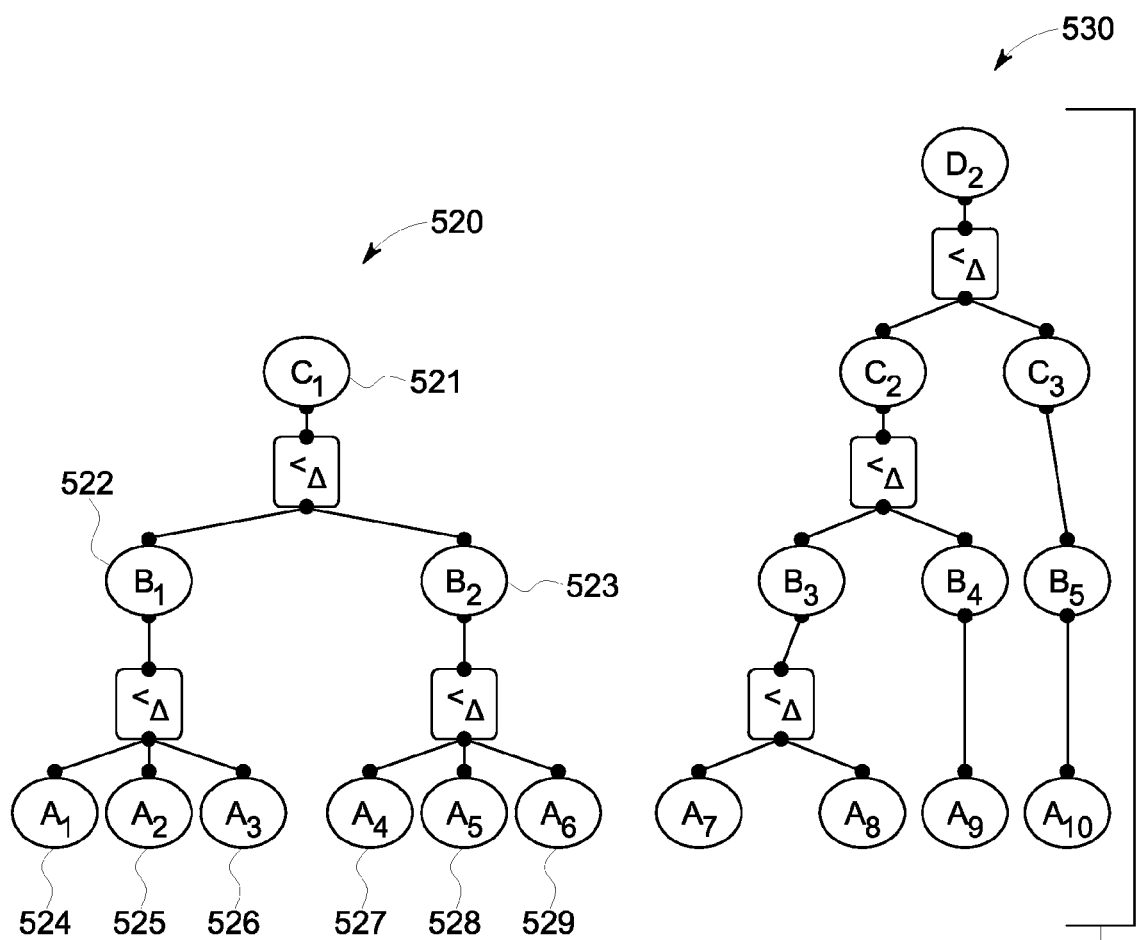
FIG. 6B depicts examples of shape similarity trees for some of the cells depicted in FIG. 6A, in accordance with one embodiment.

Using these constraints, the segmentation at various different hierarchical scale levels (e.g., scale levels A, B, C, D and E) may be represented as a shape similarity tree. FIG. 6B depicts examples of shape similarity trees 520 and 530 for some of the shapes depicted in FIG. 6A, according to one embodiment. The root of similarity tree 520 is node 521, which represents the shape with the minimum cost (in this example, shape $C_1$ indicated at 521), and the leaves of similarity tree 520 are nodes 524-529 (in this example, shapes $A_1$-$A_6$ indicated at 524-529). Shapes at a given segmentation scale level in the similarity tree are ranked with respect to shapes at adjacent segmentation scale levels according to the ranking function d(x) (Eq. 8). For example, as depicted in FIG. 6B, shape $C_1$ 521 may be ranked with respect to constituent shapes $B_1$ 522 and $B_2$ 523 according to Eq. (8). Likewise, shapes $B_1$ 522 and $_2$ 523 may be ranked with respect to constituent shapes $A_1$-$A_3$ (524-526) and $A_4$-$A_6$ (527-529), respectively. The shape or set of shapes which most closely match the conforming exemplars (e.g., such as the conforming exemplars 100 depicted in FIG. 2A) can be determined as a function of the minimum cumulative cost of each shape at a plurality of segmentation scale levels in the image:

$$\min \sum_{i,l} \text{Cost}(C_i^l) = \max \sum_{i,l} \left( \frac{1}{1 + d(c_i^l)} \right) \qquad (9)$$

In some embodiments, shape similarity trees can be constructed by recursively merging constituent shapes at lower scales (e.g., at scale level l−1) to create a larger shape comprising the union of the constituent shapes if the ranking of the larger shape is higher than the ranking of a mean of the constituent shapes at the lower scale level.

Figure 6C:
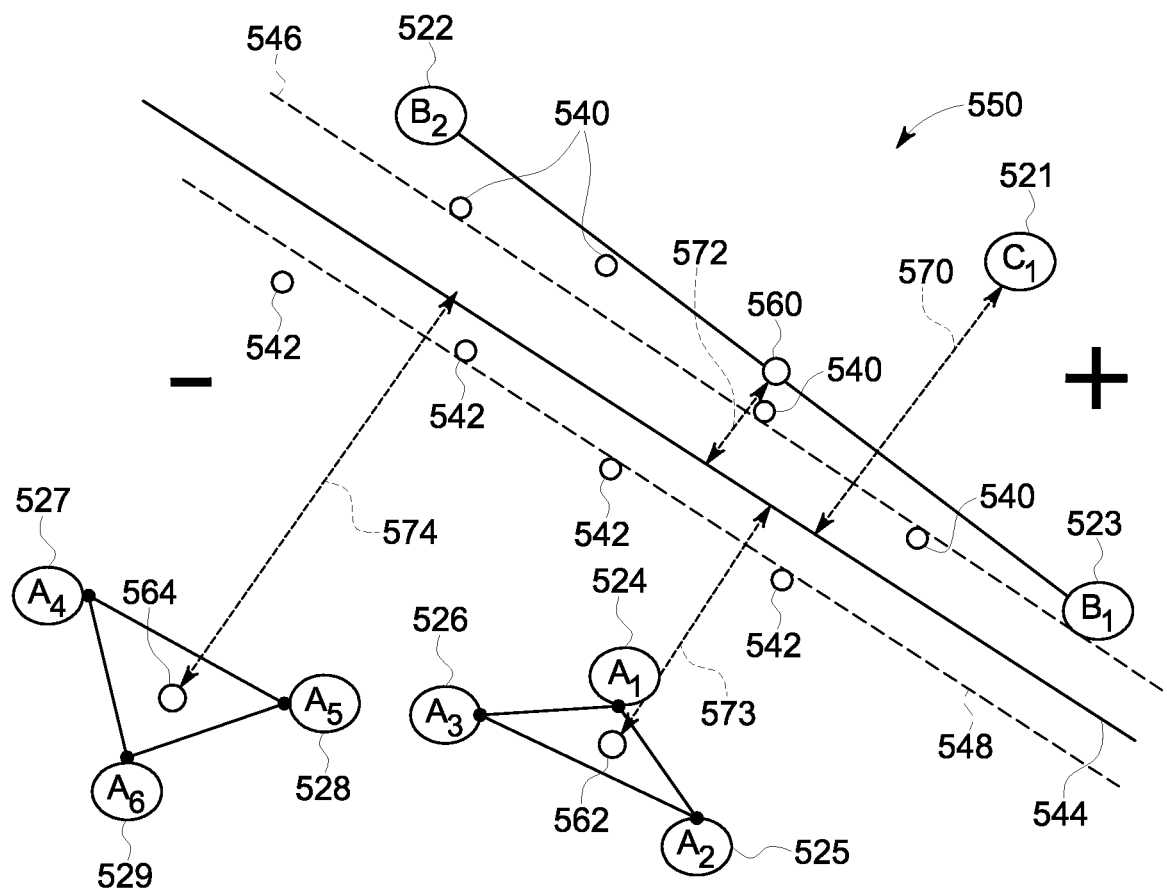
FIG. 6C depicts one example of a mapping of some of the cells depicted in FIG. 6A into a vector space, in accordance with one embodiment.

FIG. 6C depicts one example of the mapping of shape segments of an image into a vector space 550. A plurality of support vectors representing conforming shapes 540 and a plurality of support vectors representing non-conforming shapes 542 are used to define a hyperplane 544 that separates a vector space 550 into two regions (marked as "+" for the conforming region and "−" for the non-conforming region). Dashed lines 546 and 548 represent margins about the hyperplane 544. A first data point 521 corresponding to shape $C_1$ is mapped into the conforming region ("+") of the vector space 550. A second data point 560 representing a mean of the shapes $B_1$ 522 and $B_2$ 523 is mapped into the vector space 550, which also falls in the conforming region ("+") of the vector space. A first signed distance 570 is the signed distance between the first data point 521 and the hyperplane 544, and a second signed distance 572 is the signed distance between the second data point 560 and the hyperplane 544. As can been seen in this example, the first signed distance 570 exceeds the second signed distance 572 because the first data point 521 is further from the hyperplane 544 in the conforming region than the second data point 560. Thus, according to Eq. (8), shape $C_1$ 521 is ranked higher than the mean of shapes $B_1$ 522 and $B_2$ 523.

This same principle applies to mappings of shapes $A_1$-$A_3$ (524-526) and $A_4$-$A_6$ (527-529), and their respective mean shapes 562 and 564. Since the signed distances 573 and 574 between mean shapes 562 and 564, respectively, and the hyperplane 544 are less than the signed distances between the mean shape 560 and the hyperplane 544, shapes $B_1$ and $B_2$, which include constituent shapes $A_1$-$A_3$ (524-526) and $A_4$-$A_6$ (527-529), respectively, are ranked higher than shapes $A_1$-$A_3$ (524-526) and $A_4$-$A_6$ (527-529). These exemplary rankings are reflected in the shape similarity tree 520 of FIG. 6B. Therefore, effectively among all shapes $A_1$-$A_6$ (524-529), $B_1$-$B_2$ (522-523) and $C_1$ 521, shape $C_1$ is most similar to the shape exemplars that conform to the biological units in the training data (e.g., exemplars 100 of FIG. 2A) and thus represents the optimal segmentation among all shapes in the similarity tree. Likewise, shapes $A_1$-$A_6$ (524-529) are most similar to the non-conforming shape exemplars in the training data (e.g., exemplars 102 of FIG. 2B) and are thus represent the least optimal segmentation. Once the ranking of the shapes in the similarity tree are established, the optimal shapes can be determined using either a top-down or bottom-up analysis since each technique converges to the same global cost minima (Eq. 9).

The segmentation ranking results may represent a quality metric. In some embodiments, the segmentation results may displayed with a color coding to represent the quality of the relevant portion of the segmentation. For example, in one embodiment, the cells in the target digital image that are most similar to the conforming exemplars in the training data are color coded in a first color, e.g., green; those that are less similar are color coded in a second color, e.g., yellow; and those least similar to the conforming exemplars are color coded in a third color, e.g., red. Any number of colors related to any number of cell classes or categories can be used for displaying the segmentation quality metric. Additionally or alternatively, the segmentation results may displayed with a color intensity coding to represent the quality of the relevant portion of the segmentation. For example, in one embodiment, the cells in the target digital image that are most similar to the conforming exemplars in the training data are color coded in a first intensity, e.g., very intense green; those least similar to the conforming exemplars are color coded in a second intensity, e.g., a green that is not intense; and those that are somewhere between in similarity are color coded in an intermediate intensity. Such a display may enable the quality of the segmentation to be readily apparent to the user.

Figure 7A:
FIGS. 7A-7M depict several examples of segmented digital images of cells, in accordance with one embodiment.
Figure 7B:
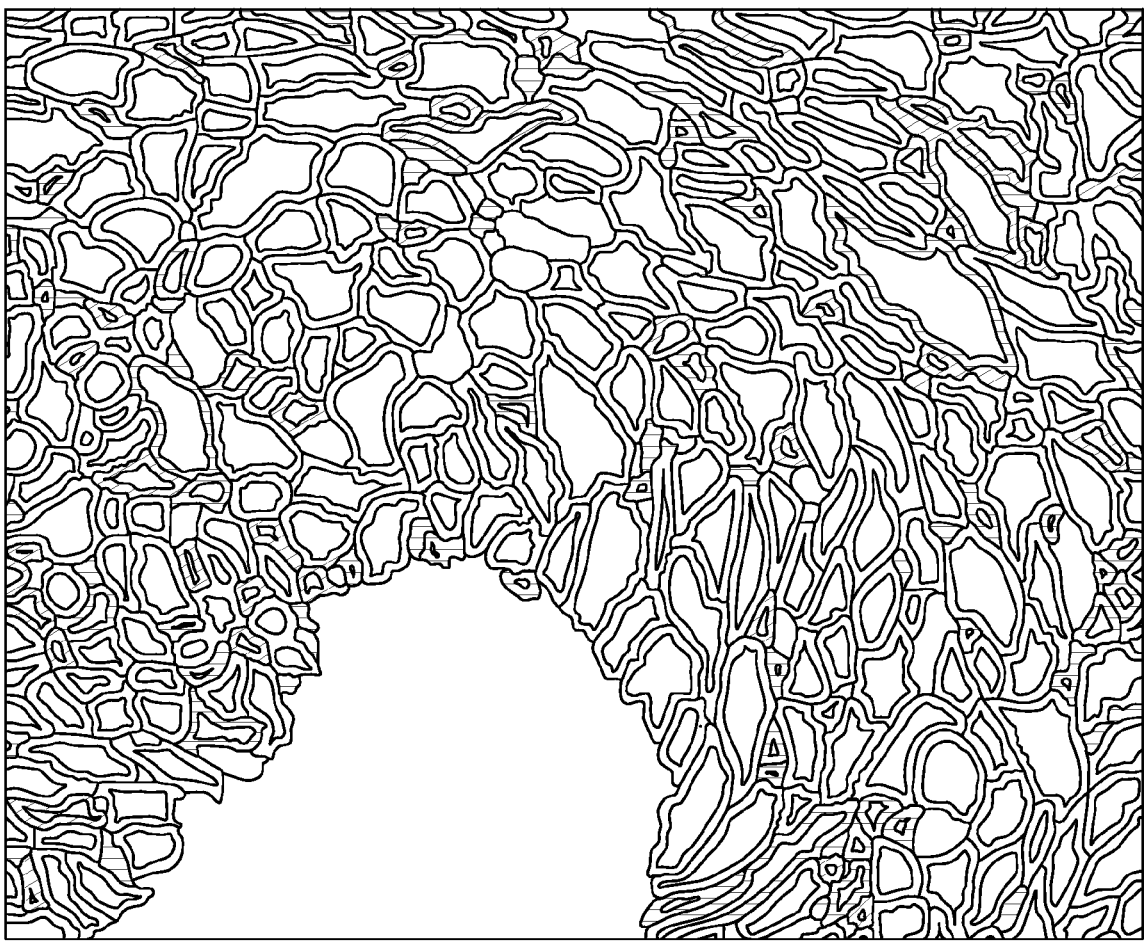
Figure 7C:
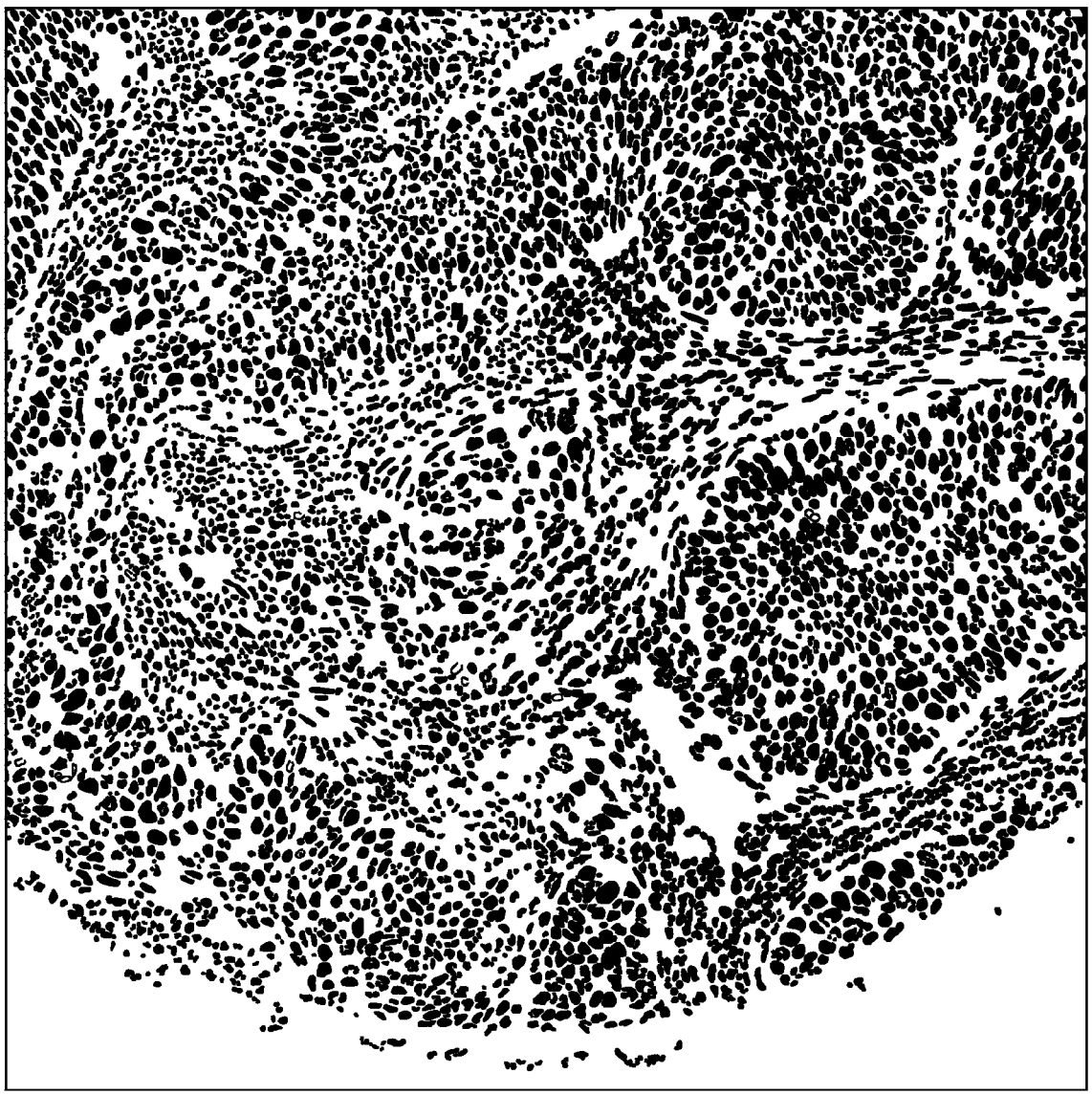

FIGS. 7A-7M depict several examples of digital images of cells prior to and following segmentation using techniques according to one or more embodiments, as taught herein. To visualize the results, the segmented cells may be color-coded according to the ranking function and/or the number of cell-classes. For example, in a two-class problem (e.g., positive and negative cell classes), cells colored in green may have the highest ranking and maximum shape similarity with respect to the positive cell class, while cells colored in red may have the lowest ranking and minimum shape similarity with respect to the positive cell class and maximum similarity with respect to the negative cell class), and cells colored in yellow may have intermediate rankings and shape similarities. In FIGS. 7A-7M, the highest ranking cells are depicted as unfilled shapes with solid outlines, the lowest ranking cells are depicted with horizontal hatch marks, and intermediately ranked cells are depicted with diagonal hatch marks. FIG. 7A shows an original epithelial cell image, while FIG. 7B shows an overlay of the epithelial cell image with the segmentation results after applying one segmentation technique as taught herein. FIG. 7C shows an image with cell nuclei.

Figure 7D:
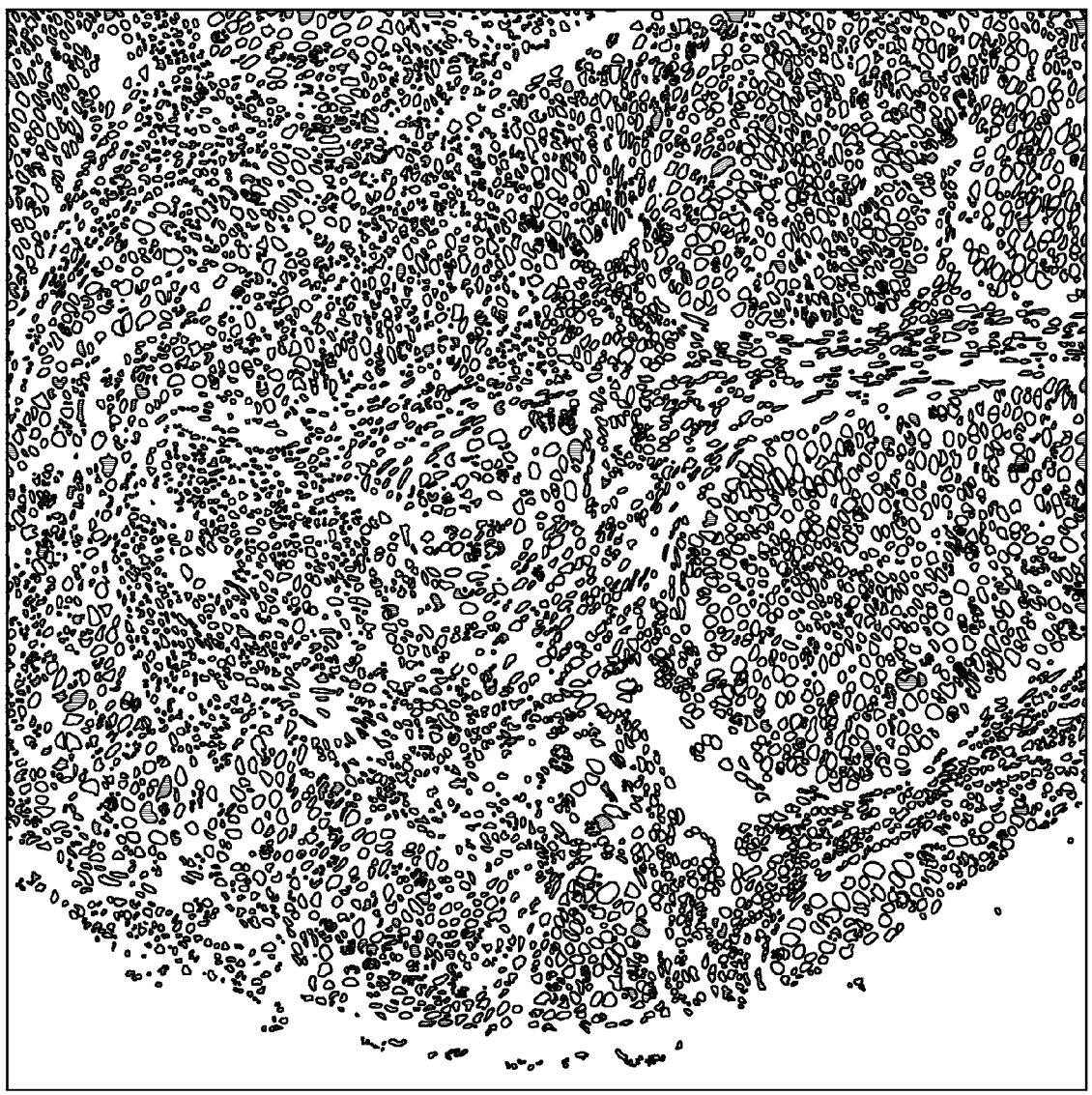
Figure 7E:
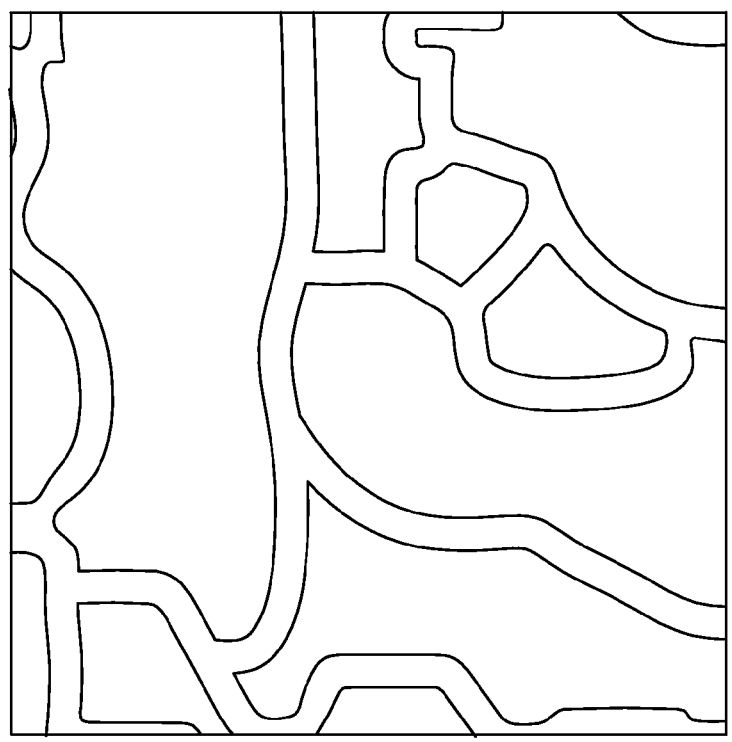
Figure 7F:
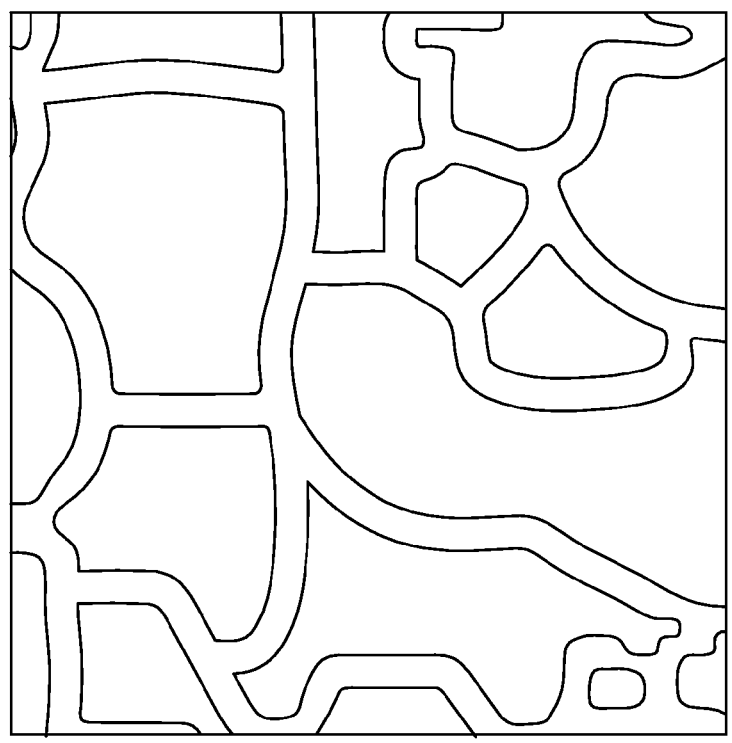
Figure 7G:
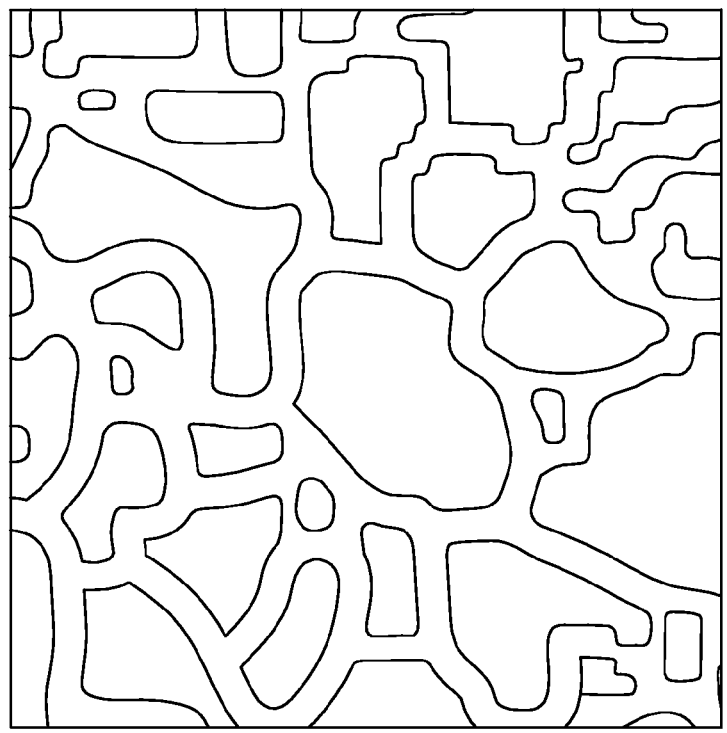
Figure 7H:
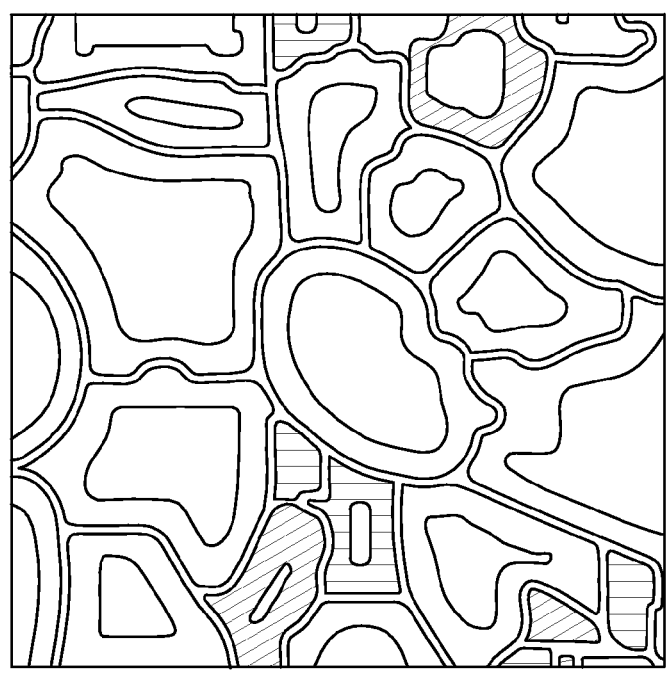
Figure 7I:
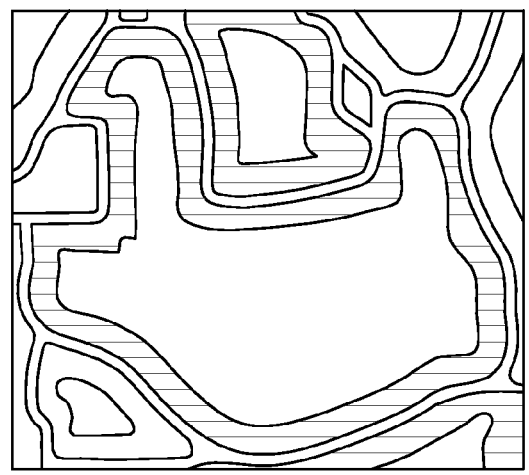
Figure 7J:
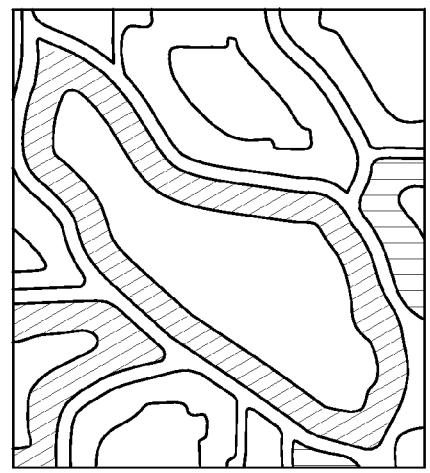
Figure 7K:
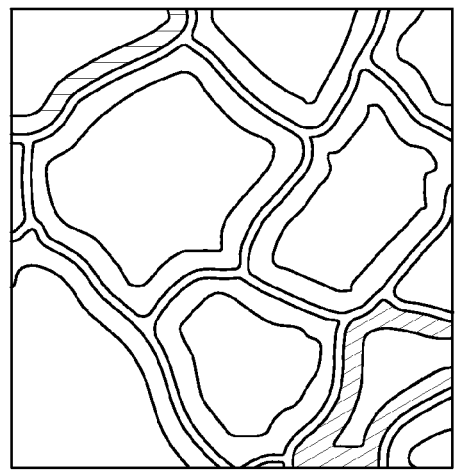
Figure 7L:
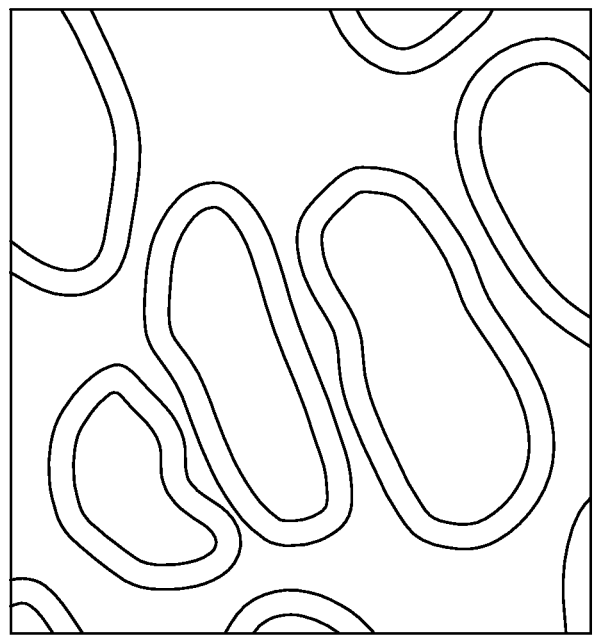
Figure 7M:
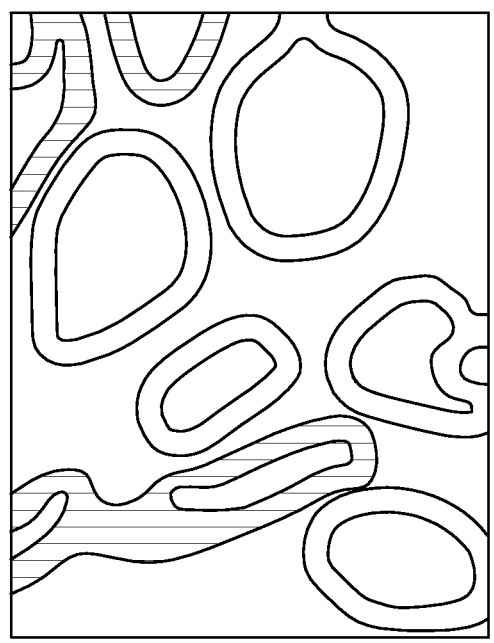
Figure 8:
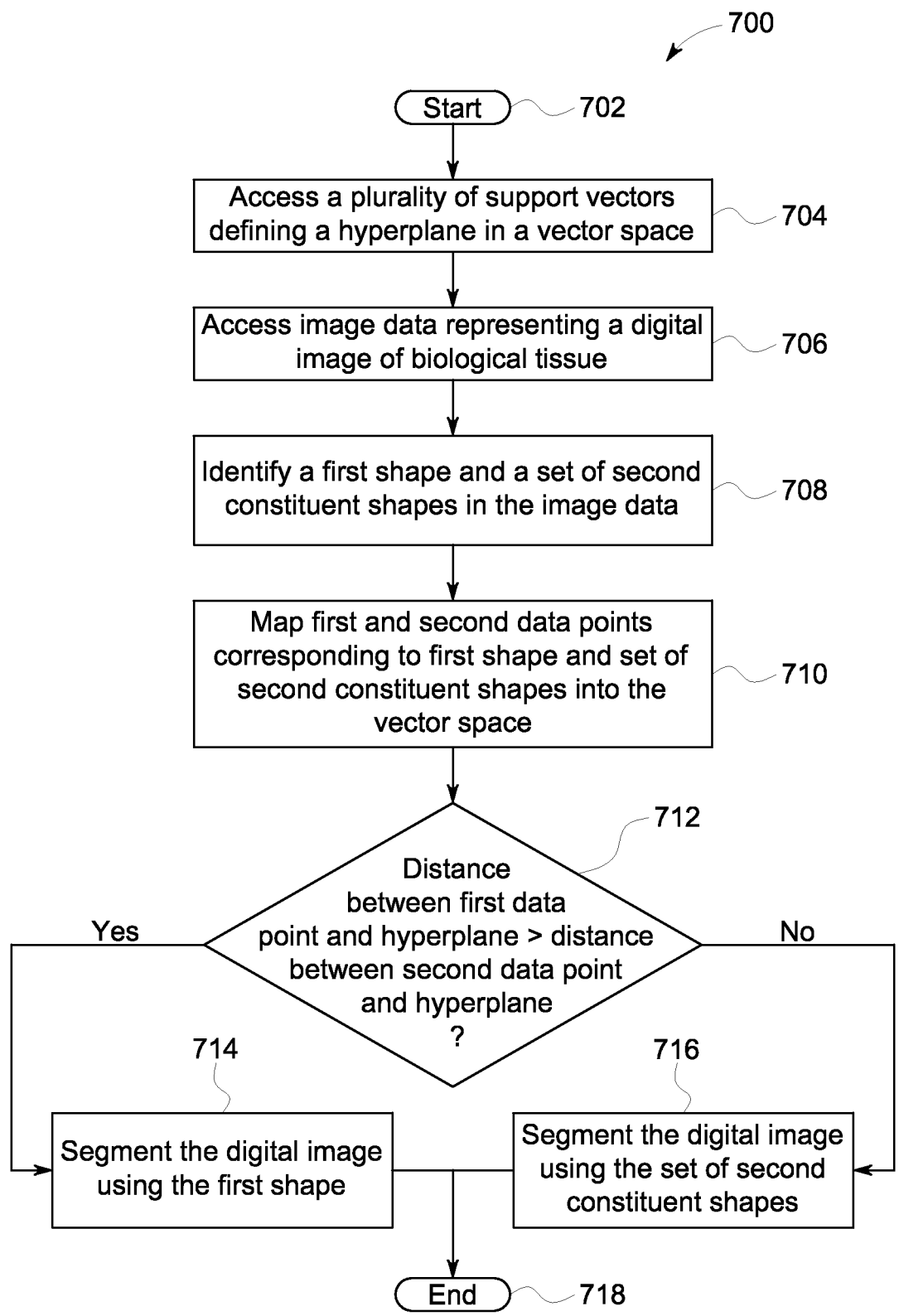
FIG. 8 is a flow chart of one example of a method of segmenting a digital image, in accordance with one embodiment.

FIG. 7D shows the nuclei segmentation result after applying one segmentation technique as taught herein. FIGS. 7E-7H show comparative results of applying a morphological watershed algorithm at three different levels: high, medium and low, and a segmentation after applying one segmentation technique as taught herein. Note the over and under segmentation effects in the first three cases as oppose to the results obtained using a segmentation technique as taught herein. FIGS. 7I-7K show details of epithelial cells with low, medium and high ranking respectively. Note that the cell in FIG. 7I has an irregular shape and is relatively larger than others, while the cell in FIG. 7J has an elliptical-like shape, and cells in FIG. 7K have smooth contours and circular-like shapes. FIGS. 7L and 7M show details of the segmentation results as applied to nuclei using a segmentation technique as taught herein. Note that cells with the high rank (which may be colored in green) have an elliptical and circular type of shape as compared with cells having a low rank (which may be colored in red). It will be understood that embodiments taught herein may be generalized and applied to other types of biological tissue. Different models (i.e., hyperplanes) may be created for different cell morphologies to enable the segmentation techniques as taught herein to be applied to those cells morphologies. Further, the method is not limited to a two-class cell problem as it can be used for solving a one-class or multi-class cell problem.

FIG. 7 is a flow diagram of one example of a process 700 of segmenting a digital image, according to one embodiment. Process 700 begins at block 702. At block 704, a plurality of support vectors are accessed (e.g., from a memory of a computer). The support vectors may be pre-computed from training data representing a set of conforming exemplary cells and a set of non-conforming exemplary cells. Further, the support vectors may be used to define a hyperplane in a vector space, where the hyperplane separates support vectors representing the conforming cells from support vectors representing non-conforming cells, such as depicted in the example of FIG. 6C.

At block 706, image data representing a target digital image is accessed (e.g., from the memory). The digital image may include an image of biological tissue (including cells). At block 708, at least one first shape is identified in the image using a conventional segmentation technique, such as, but not limited to, a watershed transform, mean shift segmentation, graph based segmentation and/or normalized cuts. For example, referring to FIG. 6A, the first shape may be shape $B_1$. Further at block 708, a set of second constituent shapes are identified in the image. In this example, the set of second constituent shapes are shapes that constitute shape $B_1$ at the adjacent scale level, and include shapes $A_1$, $A_2$ and $A_3$. As can be seen, shape $B_1$ is the union of shapes $A_1$, $A_2$ and $A_3$, and none of the latter shapes intersects any hierarchical shape other than shape $B_1$. In this example, only shapes at two adjacent scale levels are used; however, it will be appreciated that shapes at more than two scale levels may be used by iteratively identifying shapes at different scale levels. The boundaries of each shape may be identified in the segmented image using, for example, a multiscale analysis based on a shape descriptor (e.g., a two-dimensional variable diameter ring) as in Eq. (2), described above.

At block 710, a first data point representing the first shape (e.g., shape $B_1$) is mapped into the vector space. Referring to the example of FIG. 6C, the first data point may be data point 523. Further, a second data point representing the set of second constituent shapes (e.g., shapes $A_1$, $A_2$ and $A_3$) is mapped into the vector space. Referring again to the example of FIG. 6C, the second data point may data point 562, which represents the mean of shapes $A_1$, $A_2$ and $A_3$. At block 712, the signed distance between the first data point (e.g., point 523) and the hyperplane (e.g., hyperplane 544) is compared to the signed distance between the second data point (e.g., point 562) and the hyperplane. If the signed distance of the first data point is greater than the signed distance of the second data point, process 700 proceeds to block 714; otherwise, process 700 proceeds to block 716. In the example of FIG. 6C, since the signed distance of the first data point is positive and the signed distance of the second data point is negative, process 700 will proceed to block 714.

At block 714, the digital image is segmented using the first shape (e.g., shape $B_1$), since it was determined above that the first shape is more similar to the conforming exemplars than the set of second constituent shapes. At block 716, the digital image is segmented using the set of second constituent shapes instead of the first shape, since it was determined above that the set of second constituent shapes is more similar or no more similar to the conforming exemplars than the first shape. It should be noted that the above-described process may be iteratively repeated for first shapes and sets of second constituent shapes at different adjacent scale levels (e.g., levels A and B, B and C, C and D, and D and E) to identify the optimum segmentation for the digital image. As discussed above, the optimum segmentation may be determined using either a top-down (highest scale to lowest scale) or bottom-up (lowest scale to highest scale) analysis. From either block 714 or 716, process 700 proceeds to end at block 718.

Figure 9:
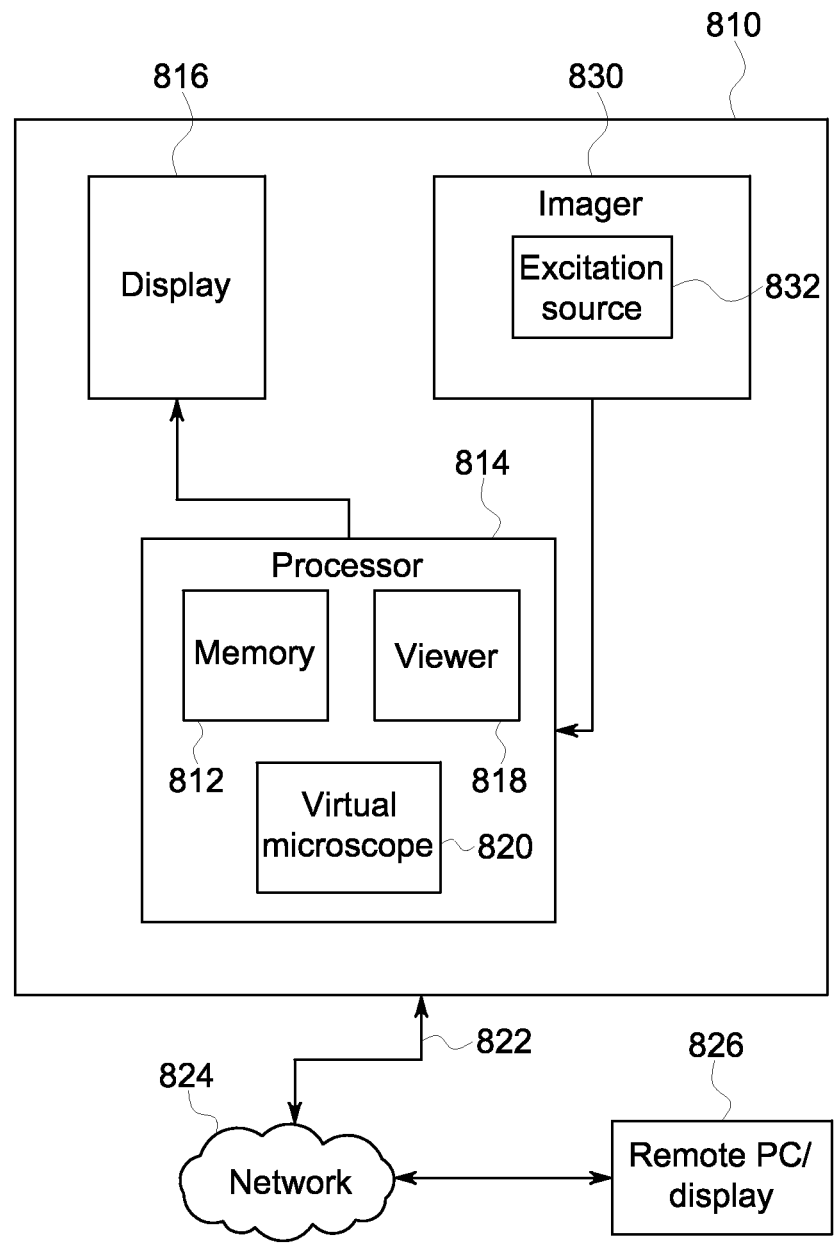
FIG. 9 is a block diagram of one example of a system for carrying out one or more embodiments.

FIG. 9 is a block diagram of one example of a system 810 in accordance with one or more embodiments. In FIG. 9, system 810 includes a processor 814 and a display 816. Memory 812 may include any suitable memory associated with the processor, such as ROM (read only memory), RAM (random access memory) or DRAM (dynamic random access memory), or any suitable non-transitory memory medium, such as a DVD, CD or memory card. In some embodiments, processor 814 includes memory 812 and/or display 816. In these embodiments, memory 812 includes executable instructions for performing one or more of the methods or processes taught herein. In other embodiments, the memory 812 and/or display 816 may be communicatively coupled to the processor 814, but not part of processor 814. In these embodiments, the memory 812 and/or display 816 may still be accessed through any suitable connection device or communications network including but not limited to local area networks, cable networks, satellite networks, and the Internet, regardless whether hard wired or wireless. In some embodiments, memory 812 is both included in processor 814 and communicatively coupled to processor 814. One or more elements of memory 812 may further include image data representing at least one digital image of biological tissue. One or more elements of memory 812 may be configured to store data representing a plurality of support vectors that define a hyperplane in vector space and that have been calculated from training data. One or more elements of memory 812 may be configured to store training data representing shapes of conforming biological unit exemplars and shapes of non-conforming biological unit exemplars. For example, the training data may include images of biological tissue in which cells have been segmented and classified as either good segmentations or poor segmentations. The processor 814, or CPU, may comprise a microprocessor, microcontroller and a digital signal processor (DSP).

In some embodiments, the processor 814 may be configured to access the image data, the training data and/or the support vectors stored in the memory 812 or in a memory of a remote device 826.

The memory 812 and the processor 814 may be incorporated as components of an analytical device such as an automated high-speed system that images and analyzes in one system. Examples of such systems include, but are not limited to, General Electric's InCell analyzing systems (General Electric Healthcare Bio-Sciences Group, Piscataway, N.J.). In some such embodiments, system 810 may include a digital imager 830, an interactive viewer 818, and a virtual microscope 820. Digital imager 830 may be, for example, a fluorescent imaging microscope having an excitation source 832 and configured to capture digital images of the biological samples. In embodiments that are part of a larger analytical device, system 810 may include a network interface 822 for transmitting one or more of the images or any related data or analytical information over a communications network 824 to one or more remote systems 826.

The network interface 822 in embodiments of system 810 may include any components configured to transmit and/or receive data over a communications network, including hardwired or wireless digital communications systems. In embodiments in which system 810 includes network interface 822, network interface 822 may additionally or alternatively be used for receiving one or more of the images or any related data or analytical information over a communications network 824 from one or more remote systems 826.

System 810 and/or system 826 may include a display 816. The display 816 may include any device capable of displaying a digital image, such as devices that incorporate an LCD or CRT.

In some embodiments, the memory 812 may include executable code for performing segmentation of cells or other biological units, including calculating the support vectors from the training data, identifying the first shape and the set of second constituent shapes using the image data, mapping the first and second data points corresponding to the first shape and set of second constituent shapes, respectively, and/or segmenting the digital image using the first shape or the set of second constituent shapes based on the respective distances of the first and second data points from the hyperplane. One of ordinary skill in the art will understand that many known automated segmentation methods and techniques may be employed in conjunction with the methods taught herein, which may include watershed feature detection, statistically driven thresholding, (e.g., Otsu, mean, MinError, Huang, triangles, and MinMax thresholding) and/or edge enhancing filters (e.g., unsharp masking, Sobel filtering, Gaussian filters, Kalman filters). In some embodiments, a conventional segmentation technique (e.g., a watershed transform) may be implemented in the executable code for generating a weak segmentation for identifying the first shape and/or the set of second constituent shapes. In some embodiments, the executable code may include functionality for user-assisted segmentation of cells or other objects (e.g., tools allowing users to indicate cell or object boundaries).

Embodiments taught herein may be used in a variety of applications, such as cell differentiation, cell growth, cell movement and tracking, and cell cycle analysis. Cell differentiation includes identification of subpopulations of cells within cell clusters. Such information may be useful in many different types of cellular assays, such as co-culture assays in which two or more different kinds of cells are grown together.

Having thus described several exemplary embodiments of the invention, it is to be appreciated various alterations, modifications, and improvements will readily occur to those skilled in the art. For example, in some embodiments, digital images of biological units other than cells may be segmented. The biological units may include biological structures larger than cells, such as the lens of an eye, a heart valve, or an entire organ. Such alterations, modifications, and improvements are intended to be part of this disclosure, and are intended to be within the scope of the invention. Accordingly, the foregoing description and drawings are by way of example only.

What is claimed is:

1. A computer-implemented method of segmenting a digital image of biological tissue, the computer including a processor and a memory operatively coupled to the processor, the method comprising acts of:
accessing, in the memory, a ranking model calculated from training data representing shapes of conforming biological unit exemplars and shapes of non-conforming biological unit exemplars, the ranking model defining a ranking of a quality of the shapes in the training data with respect to the conforming biological unit exemplars and the non-conforming biological unit exemplars;

accessing, in the memory, image data representing the digital image of biological tissue;

identifying, by the processor, a first shape and a set of second constituent shapes in the digital image using the image data, wherein the first shape comprises a union of the set of second constituent shapes;

determining, by the processor, a rank of a first data point in the image data corresponding to the first shape and a rank of a second data point in the image data corresponding to the set of second constituent shapes using the ranking model; and segmenting, by the processor, the digital image using one of the first shape and the set of second constituent shapes based on which of the first data point and the second data point has a greater respective rank.

2. The computer-implemented method of claim 1, wherein:

the ranking model includes a plurality of support vectors calculated from the training data, the plurality of support vectors defining a hyperplane in a vector space;

the act of determining includes mapping, by the processor, the first data point and the second data point into the vector space; and the act of segmenting includes segmenting, by the processor, the digital image using one of the first shape and the set of second constituent shapes based on which of the first data point and the second data point has a greater respective distance from the hyperplane.

3. The computer-implemented method of claim 2, wherein the digital image is segmented using the first shape where the signed distance between the hyperplane and the first data point is greater than the signed distance between the hyperplane and the second data point.

4. The computer-implemented method of claim 2, wherein the digital image is segmented using the set of second constituent shapes where the signed distance between the hyperplane and the second data point is greater than the signed distance between the hyperplane and the first data point.

5. The computer-implemented method of claim 2, further comprising an act of storing the training data in the memory.

6. The computer-implemented method of claim 2, further comprising an act of computing the plurality of support vectors using the processor.

7. The computer-implemented method of claim 2, further comprising an act of computing, by the processor, a linear combination of each shape in the set of second constituent shapes, wherein the second data point corresponds to the linear combination.

8. The computer-implemented method of claim 7:

wherein the first shape and the linear combination of each shape in the set of second constituent shapes are each represented in the image data as a histogram of points corresponding to a boundary of the first shape and linear combination, respectively, each point being located on a polar coordinate plane, and wherein the method further comprises an act of computing, by the processor, the first data point and the second data point using the histogram corresponding to the first shape and the linear combination, respectively.

9. The computer-implemented method of claim 8, further comprising an act of rotating each of the first shape and the linear combination of the set of second constituent shapes such that an axis of least inertia of the respective shape coincides with a zero degree radial of the polar coordinate plane prior to computing the first data point and the second data point, the axis of least inertia including a line from which the integral of the square of distances to each point on the boundary of the respective shape is a minimum.

10. The computer-implemented method of claim 2, further comprising an act of applying, by the processor, a weak segmentation algorithm to the image data to produce the set of second constituent shapes.

11. The computer-implemented method of claim 2, further comprising acts of:

identifying, by the processor, a set of third constituent shapes in the digital image using the image data, wherein at least one shape in the set of second constituent shapes comprises a union of the set of third constituent shapes; and mapping, by the processor, a third data point corresponding to the set of third constituent shapes into the vector space, wherein the act of segmenting includes segmenting the digital image using one of the first shape, the set of second constituent shapes and the set of third constituent shapes based which of the first data point, the second data point and the third data point has a greater respective signed distance from the hyperplane.

12. The computer-implemented method of claim 11:

wherein the digital image is segmented using the first shape where the signed distance between the hyperplane and the first data point is greater than either the signed distance between the hyperplane and the second data point and the signed distance between the hyperplane and the third data point, wherein the digital image is segmented using the set of second constituent shapes where the where the signed distance between the hyperplane and the second data point is greater than either the signed distance between the hyperplane and the first data point and the signed distance between the hyperplane and the third data point, and wherein the digital image is segmented using the set of third constituent shapes where the signed distance between the hyperplane and the third data point is greater than either the signed distance between the hyperplane and the first data point and the signed distance between the hyperplane and the second data point.

13. The computer-implemented method of claim 11, further comprising an act of applying, by the processor, a weak segmentation algorithm to the image data to produce the set of third constituent shapes.

14. The computer-implemented method of claim 2, wherein each segment of the digital image represents a cell.

15. The computer-implemented method of claim 14, further comprising displaying, on a display operatively coupled to the processor, the segmented digital image using a color coding of each cell, wherein the color coding represents a quality of the segmentation.

16. A non-transitory computer-readable medium having stored thereon computer-executable instructions that when executed by a computer cause the computer to:

access a ranking model calculated from training data representing shapes of conforming biological unit exemplars and shapes of non-conforming biological unit exemplars, the ranking model defining a ranking of a quality of the shapes in the training data with respect to the conforming biological unit exemplars and the non-conforming biological unit exemplars;

access image data representing a digital image of biological tissue;

identify a first shape and a set of second constituent shapes in the digital image using the image data, wherein the first shape comprises a union of the set of second constituent shapes;

determine a rank of a first data point in the image data corresponding to the first shape and a rank of a second data point in the image data corresponding to the set of second constituent shapes into the vector space; and segment the digital image using one of the first shape and the set of second constituent shapes based on which of the first data point and the second data point has a greater respective rank.

17. The non-transitory computer-readable medium of claim 16, further comprising computer-executable instructions that when executed by the computer cause the computer to apply a weak segmentation algorithm to the image data to produce the set of second constituent shapes.

18. A system for segmenting a digital image of biological tissue comprising:

a processor;

an input coupled to the processor and configured to receive image data representing the digital image of biological tissue; and a memory coupled to the processor, the memory including computer-executable instructions that when executed by the processor cause the processor to:

access a ranking model based on training data representing shapes of conforming biological unit exemplars and shapes of non-conforming biological unit exemplars, the ranking model defining a ranking of a quality of the shapes in the training data with respect to the conforming biological unit exemplars and the non-conforming biological unit exemplars;

identify a first shape and a set of second constituent shapes in the digital image using the image data representing the digital image of biological tissue, wherein the first shape comprises a union of the set of second constituent shapes;

determine a rank of a first data point in the image data corresponding to the first shape and a rank of a second data point in the image data corresponding to the set of second constituent shapes into the vector space; and segment the digital image using one of the first shape and the set of second constituent shapes based on which of the first data point and the second data point has a greater respective rank.

19. The system of claim 18:

wherein the ranking model includes a plurality of support vectors calculated from the training data, the plurality of support vectors defining a hyperplane in a vector space, and wherein the memory further includes computer-executable instructions that when executed by the processor cause the processor to:

map the first data point and the second data point into the vector space; and segment the digital image using one of the first shape and the set of second constituent shapes based on which of the first data point and the second data point has a greater respective distance from the hyperplane.

20. The system of claim 19, wherein the digital image is segmented using the first shape where the where the signed distance between the hyperplane and the first data point is greater than the signed distance between the hyperplane and the second data point.

21. The system of claim 20, wherein the digital image is segmented using the set of second constituent shapes where the signed distance between the hyperplane and the second data point is greater than the signed distance between the hyperplane and the first data point.

22. The system of claim 20, wherein the memory further includes computer-executable instructions that when executed by the processor cause the processor to apply a watershed transform to the image data at a predetermined flooding level to produce the set of second constituent shapes.

23. The system of claim 20, wherein the memory further includes computer-executable instructions that when executed by the processor cause the processor to compute a linear combination of each shape in the set of second constituent shapes, wherein the second data point corresponds to the linear combination.

24. The system of claim 23:

wherein the first shape and the linear combination of each shape in the set of second constituent shapes are each represented in the image data as a histogram of points corresponding to a boundary of the first shape and linear combination, respectively, each point being located on a polar coordinate plane, and wherein the memory further includes computer-executable instructions that when executed by the processor cause the processor to compute the first data point and the second data point using the histogram corresponding to the first shape and the linear combination, respectively.

25. The system of claim 24, wherein the memory further includes computer-executable instructions that when executed by the processor cause the processor to rotate each of the first shape and the linear combination of the set of second constituent shapes such that an axis of least inertia of the respective shape coincides with a zero degree radial of the polar coordinate plane prior to computing the first data point and the second data point, the axis of least inertia including a line from which the integral of the square of distances to each point on the boundary of the respective shape is a minimum.

* * * * *